(12) United States Patent
Inoue et al.

(10) Patent No.: US 7,827,821 B2
(45) Date of Patent: Nov. 9, 2010

(54) ABSORPTION REFRIGERATING MACHINE

(75) Inventors: Naoyuki Inoue, Tokyo (JP); Kiichi Irie, Tokyo (JP); Yukihiro Fukusumi, Tokyo (JP)

(73) Assignee: Ebara Corporation, Tokyo (JP)

( * ) Notice: Subject to any disclaimer, the term of this patent is extended or adjusted under 35 U.S.C. 154(b) by 258 days.

(21) Appl. No.: 12/155,883

(22) Filed: Jun. 11, 2008

(65) Prior Publication Data

US 2008/0250811 A1 Oct. 16, 2008

Related U.S. Application Data

(62) Division of application No. 10/529,438, filed as application No. PCT/JP03/12250 on Sep. 25, 2003, now Pat. No. 7,398,656.

(30) Foreign Application Priority Data

| Sep. 26, 2002 | (JP) | ............................. 2002-280111 |
| Sep. 26, 2002 | (JP) | ............................. 2002-280112 |
| Jun. 11, 2003 | (JP) | ............................. 2003-166181 |

(51) Int. Cl.
  *F25B 37/00* (2006.01)
(52) U.S. Cl. .......................... 62/494; 62/497
(58) Field of Classification Search ................... 62/494, 62/497, 485, 476, 304, 238.3, 271, 171, 141, 62/114, 112, 94, 93, 101, 434, 483, 484, 62/489
See application file for complete search history.

(56) References Cited

U.S. PATENT DOCUMENTS

| 3,146,602 A * | 9/1964 | Swearingen .................... 62/85 |
| 3,167,928 A | 2/1965 | Swearingen |
| 3,248,891 A | 5/1966 | Swearingen |
| 3,367,135 A * | 2/1968 | Eisberg et al. ................. 62/475 |
| 3,404,536 A | 10/1968 | Aronson |
| 3,949,566 A * | 4/1976 | Hopkins ........................ 62/475 |

(Continued)

FOREIGN PATENT DOCUMENTS

CN 1364228 8/2002

(Continued)

OTHER PUBLICATIONS

Abstract of JP 2001-82825 A to Ikumi et al.*

(Continued)

*Primary Examiner*—Mohammad M Ali
(74) *Attorney, Agent, or Firm*—Westerman, Hattori, Daniels & Adrian, LLP

(57) ABSTRACT

To provide a highly efficient and compact absorption refrigerating machine with water heated from 60 to 70 degrees Celsius as the heat source. In an absorption refrigerating machine including a regenerator G, condenser C, an absorber A, an evaporator E, an auxiliary regenerator GX and an auxiliary absorber AX, the concentrated solution from G is heated and further concentrated in GX, while the diluted solution from A is cooled in AX, the refrigerant vapor from GX is absorbed. A low temperature heat exchanger XL is provided for heat exchange between the concentrated solution supplied from GX to A, and the diluted solution sent from AX to G, and a high temperature heat exchanger XH is provided for heating the diluted solution leaving from XL and sent to G with the concentrated solution supplied from G to GX.

4 Claims, 17 Drawing Sheets

U.S. PATENT DOCUMENTS

| | | | |
|---|---|---|---|
| 4,009,575 A * | 3/1977 | Hartman et al. | 60/648 |
| 4,458,499 A | 7/1984 | Grossman | |
| 4,467,623 A * | 8/1984 | Reimann | 62/494 |
| 4,470,269 A * | 9/1984 | Takemi et al. | 62/235.1 |
| 4,593,531 A | 6/1986 | Fujimoto | |
| 4,672,821 A | 6/1987 | Furutera et al. | |
| 4,770,005 A * | 9/1988 | Alefeld | 62/467 |
| 5,058,394 A | 10/1991 | Wilkinson | |
| 5,070,703 A | 12/1991 | Wilkinson | |
| 5,367,884 A | 11/1994 | Phillips et al. | |
| 5,579,652 A * | 12/1996 | Phillips et al. | 62/476 |
| 5,600,967 A * | 2/1997 | Meckler | 62/476 |
| 5,636,526 A | 6/1997 | Plzak et al. | |
| 5,771,710 A * | 6/1998 | Erickson | 62/494 |
| 6,536,229 B1 | 3/2003 | Takabatake et al. | |
| 6,701,726 B1 | 3/2004 | Kolk et al. | |
| 6,769,266 B2 | 8/2004 | Dodo et al. | |

FOREIGN PATENT DOCUMENTS

| | | | |
|---|---|---|---|
| JP | 55-49668 | 4/1980 | |
| JP | 55-049668 | 4/1980 | |
| JP | 55-51151 | 12/1980 | |
| JP | 58-33467 | 7/1983 | |
| JP | 62-106268 A | 5/1987 | |
| JP | 63-61849 A | 3/1988 | |
| JP | 06-185827 | 7/1994 | |
| JP | 06-185828 | 7/1994 | |
| JP | 2000-283590 | 10/2000 | |
| JP | 2001-82821 | 3/2001 | |
| JP | 2001-82825 A * | 3/2001 | |
| JP | 2002-318023 | 10/2002 | |

OTHER PUBLICATIONS

Machine translation of JP 2001-82825 A to Ikumi et al.*
Japanese Office Action dated May 7, 2009 of JP 2004-553137.
Japanese Office Action dated Dec. 3, 2008 of JP 2004-553137.
Chinese Office Action for Chinese Application 038231395 dated Jul. 10, 2006.

* cited by examiner

ABSORPTION REFRIGERATING MACHINE

This application is a divisional application of prior application Ser. No. 10/529,438 filed Mar. 25, 2005, which is a national stage of International Application No. PCT/JP2003/012250 filed on Sep. 25, 2003, the benefit of which is claimed under 35 U.S.C. §120.

TECHNICAL FIELD

The present invention relates to an absorption refrigerating machine and more particularly to an absorption refrigerating machine for utilizing as a heat source, hot water at relatively low temperatures for example 60 to 70 degrees Celsius such as from engine cooling exhaust heat (hot water in engine jackets), cooling exhaust heat from industrial processes, or recovered hot water heat from boiler exhaust gases.

BACKGROUND ART

Exhaust heat at relatively low temperatures of 60 to 70 degrees Celsius such as from engine cooling exhaust heat (hot water in engine jackets) or cooling exhaust heat from industrial processes is present in large quantities throughout the world. However, there are few uses for this type of exhaust heat since the temperature is low, so that this exhaust heat is directly discarded or indirectly discarded via a cooling tower.

An absorption refrigerating machine for producing cold water using exhaust heat water as a heat source is known in the related art. An example for producing cold water at approximately 7 degrees Celsius for air conditioning from cooling water at 30 to 31 degrees Celsius as a cooling source by using a cooling tower is shown by the single effect absorption cycle plotted on the Dühring diagram in FIG. 14.

Refrigerant is evaporated in the evaporator E. The refrigerant shifts along the dashed line between E and A in the figure and is absorbed in the absorber A. The diluted solution whose concentration has dropped is heated in the regenerator G with an external heat source. Refrigerant vapor is discharged in a quantity equal to that of the refrigerant evaporated in the evaporator E, and the diluted solution is concentrated and returned to the absorber A. A heat exchanger X is utilized (for heat exchange between the concentrated solution side X2 and the diluted solution side X1) at this time to recover the heat. The refrigerant vapor generated in the regenerator G shifts along the dashed line between G and C in the figure, is condensed in the condenser C and becomes refrigerant liquid. This refrigerant liquid returns from the condenser C to the evaporator E.

When the evaporation temperature is 5 degrees Celsius, the absorber outlet temperature is 35 degrees Celsius, and the condensation temperature is 35 degrees Celsius, the solution temperature of the regenerator reaches 69 to 74 degrees Celsius. The temperature of the hot water inlet serving as the heat source needs about 75 degrees Celsius.

In other words, in the single effect absorption refrigerating machine, hot water at the temperature of the 65 to 70 degrees Celsius serving as the heat source is too low in the temperature to produce the cold water at approximately 7 degrees Celsius.

There is also a commercial double-concentrating type absorption refrigerating machine capable of producing cold water of less than 10 degrees Celsius for air conditioning applications, using exhaust heat water of around 60 to 65 degrees Celsius as the heat source, and cooling water from a cooling tower of about 30 to 31 degrees Celsius as the cooling source.

In the example shown in FIG. 15, both the regenerators GL, GH have approximately the same heat transfer area, and both the absorbers AL, AH have approximately the same heat transfer area in the double-concentrating absorption cycle plotted on the Dühring diagram. This figure shows an example cycle of this general heat transfer area relationship.

The refrigerant evaporates in the evaporator E, shifts along the dashed line between E and AL in the figure, and is absorbed in the absorber AL.

The diluted solution whose concentration has dropped is heated with an external heat source in the low-pressure regenerator GL. Refrigerant vapor is discharged in a quantity equal to that of the refrigerant evaporated in the evaporator, the diluted solution is concentrated and returned to the absorber AL. At this time, a low-temperature heat exchanger XL (for heat exchange between the concentrated solution side XL2 and the diluted solution side XL1) is utilized for recovering the heat.

The refrigerant vapor generated in the low-pressure regenerator GL shifts along the dashed line between GL-AH in the figure, and is absorbed in the high-pressure absorber AH. The diluted solution whose concentration has dropped in the high-pressure absorber AH is heated with an external heat source in the high-pressure regenerator GH. Refrigerant vapor is discharged in a quantity equal to that of the refrigerant generated in the low-pressure regenerator GL, or in other words the same quantity as that of the refrigerant evaporated by the evaporator E. The diluted solution is then concentrated and returned to the high-pressure absorber AH. A high-temperature heat exchanger XH (for heat exchange between the concentrated solution side XH2 and the diluted solution side XH1) is utilized for recovering the heat from the solution.

The refrigerant vapor generated in the high-pressure regenerator GH shifts along the dashed line between GH and C in the figure, is condensed in the condenser C, and becomes refrigerant liquid. This refrigerant liquid returns from the condenser C to the evaporator E.

The double-concentrating type absorption refrigerating machine therefore contains many internal devices and is large in size. Moreover, the high-pressure regenerators GH and the low-pressure regenerator GL need to generate refrigerant vapor equal in quantity to that of the refrigerant vapor generated by the evaporator E two times. The efficiency is therefore less than half of that of the single effect absorption refrigerating machine. Therefore the double-concentrating type absorption refrigerating machine has been seldom used.

There is also an absorption refrigerating machine capable of operating with exhaust heat water of approximately 65 degrees Celsius as a heat source. However, this refrigerating machine is even larger than the double-concentrating type absorption refrigerating machine, and is expensive, and has low heat efficiency, and therefore is seldom utilized.

There is also an absorption refrigerating machine having a high-pressure and low-pressure absorbers and regenerators (FIG. 16), as is an absorption refrigerating machine intermediate between the single effect and the double-concentrating type absorption refrigerating machines. This type of absorption refrigerating machine is somewhat smaller in size than the double-concentrating type absorption refrigerating machine and has better heat efficiency. Yet an absorption refrigerating machine with better heat efficiency has been demanded.

In FIG. 16, the refrigerant evaporates in the evaporator E, shifts along the dashed line between E and A in the figure, and is absorbed in the absorber A. The diluted solution of the absorber outlet port whose concentration is reduced, is sent to the auxiliary absorber AX, and while being cooled in the auxiliary absorber AX, absorbs the refrigerant vapor (shifting along the dashed line between GX and AX in the figure) from the auxiliary regenerator GX.

The diluted solution, from the auxiliary absorber AX whose concentration is reduced, is sent to the regenerator G, and is heated and concentrated with the external heat source in the regenerator. The refrigerant vapor that was generated, shifts along the dashed line between G and C in the figure, is condensed in the condenser C and becomes refrigerant liquid. This refrigerant liquid returns from the condenser C to the evaporator E. The solution concentrated in regenerator G on the other hand, is further heated and concentrated with the external heat source in the auxiliary regenerator GX, and returns to the absorber A. The refrigerant vapor that was generated, shifts along the dashed line between GX and AX in the figure and is absorbed in the auxiliary absorber AX.

In the solution circulating system in this cycle, a solution pump is required in order to feed the solution from the absorber A to the auxiliary absorber AX having a higher pressure than the absorber. A solution pump is also required for feeding solution from the auxiliary absorber AX to the regenerator G. Balance control of solution flow rate is also required for feeding the total flow rate from the auxiliary absorber AX to the regenerator C, and therefore, the system is complicated.

In other words, when the quantity fed from the auxiliary absorber to the regenerator is too small, solution collects in the auxiliary absorber, and the solution quantity in the regenerator to auxiliary regenerator to absorber system becomes small, and ultimately cavitation occurs due to insufficient quantity of the solution in the solution pump for sending the solution from the absorber to the auxiliary absorber, so that operation is disabled. On the other hand, if the quantity fed from the auxiliary absorber to the regenerator is too large, then the solution quantity of auxiliary absorber is insufficient so that cavitation occurs in the solution pump for sending the solution from the auxiliary absorber to the regenerator and operation is disabled. Therefore, control or the like is required to balance the solution flow rates into and out of the auxiliary absorber.

In view of the above problems with the conventional art, present invention has the object to provide a compact absorption refrigerating machine with improved heat exchanger disposing positioning, better efficiency, and capable of using hot water at 60 to 70 degrees Celsius as a heat source.

DISCLOSURE OF THE INVENTION

As shown for example in FIG. 1, to attain the aforementioned object, the absorption refrigerating machine of the present invention is provided with a regenerator G for generating refrigerant vapor and concentrating a solution; a condenser C for condensing the generated refrigerant vapor; an evaporator E for evaporating the condensed refrigerant; an absorber A for absorbing the evaporated refrigerant vapor into the solution; an auxiliary regenerator GX for heating the concentrated solution from the regenerator G, generating the refrigerant vapor and further concentrating the solution; an auxiliary absorber AX for absorbing the refrigerant vapor generated in the auxiliary regenerator while cooling a diluted solution from the absorber A; a low-temperature heat exchanger XL for performing heat exchange between the concentrated solution sent from the auxiliary regenerator GX to the absorber A and the diluted solution sent from the auxiliary absorber AX to the regenerator G; a high-temperature heat exchanger XH for heating the diluted solution leaving the low-temperature heat exchanger XL and sent to the regenerator G with the concentrated solution sent from the regenerator G to the auxiliary regenerator GX.

The absorption refrigerating machine of the present invention may also be provided with a regenerator G for generating refrigerant vapor and concentrating a solution; a condenser C for condensing the generated refrigerant vapor; an evaporator E for evaporating the condensed refrigerant; an absorber A for absorbing the evaporated refrigerant vapor into the solution and; an auxiliary regenerator GX for heating the concentrated solution from the regenerator G, generating the refrigerant vapor and further concentrating the solution; an auxiliary absorber AX for absorbing the refrigerant vapor generated in the auxiliary regenerator GX while cooling a diluted solution from the absorber A, wherein a heat transfer area of the auxiliary regenerator GX is equal to or smaller than one-third of a heat transfer area of the regenerator G, and a heat transfer area of the auxiliary absorber AX is equal to or smaller than two-thirds of a heat transfer area of the absorber A.

As shown for example in FIG. 7, the absorption refrigerating machine of the present invention may be provided with a regenerator G for generating refrigerant vapor and concentrating a solution; a condenser C for condensing the generated refrigerant vapor; an evaporator E for evaporating the condensed refrigerant; an absorber A for absorbing the evaporated refrigerant vapor into the solution; an auxiliary regenerator GX for heating the concentrated solution from the regenerator G, generating the refrigerant vapor and further concentrating the solution; an auxiliary absorber AX for absorbing the refrigerant vapor generated in the auxiliary regenerator GX while cooling a diluted solution from the absorber A; a circulating path 1, 2, 3, 4 for allowing the solution to reach the absorber A in sequence from the absorber A, the auxiliary absorber AX, the regenerator G, and the auxiliary regenerator GX; and at least one of means VGH, VGS for controlling heat transfer performance of the auxiliary regenerator GX and means VAW, VAS for controlling heat transfer performance of the auxiliary absorber AX.

As shown for example in FIG. 9, the absorption refrigerating machine of the present invention may be provided with a regenerator G for generating refrigerant vapor and concentrating a solution; a condenser C for condensing the generated refrigerant vapor; an evaporator E for evaporating the condensed refrigerant; an absorber A for absorbing the evaporated refrigerant vapor into the solution; an auxiliary regenerator GX for heating the concentrated solution from the regenerator, generating the refrigerant vapor and further concentrating the solution; and an auxiliary absorber AX for absorbing the refrigerant vapor generated in the auxiliary regenerator GX while cooling the diluted solution, the auxiliary absorber AX being constructed to utilize as the diluted solution a portion of diluted solution mixture made up of the diluted solution of the absorber A outlet and the diluted solution of the auxiliary absorber AX outlet; a path 2 for sending the remainder of the diluted solution mixture to the regenerator G; a low-temperature heat exchanger XL for heating the diluted solution mixture sequentially on the path 2 with the concentrated solution supplied from the auxiliary regenerator GX to the absorber A; and a high-temperature heat exchanger XH for heating the diluted solution mixture leaving from the low-temperature heat exchanger XL and sent to the regenerator G with the concentrated solution supplied from the regenerator G to the auxiliary regenerator GX.

Also, the absorption refrigerating machine of the present invention may be provided, wherein, as shown for example in FIG. 5 and FIG. 12, the absorber A is subdivided into a low-pressure absorber AL and a high-pressure absorber AH, the evaporator E is subdivided into a low-pressure evaporator EL and a high-pressure evaporator EH, the cold water 10 is first of all supplied to the high-pressure evaporator EH, the cooled cold water 10 is next supplied to the low-pressure evaporator EL, as shown for example in FIG. 5, the concentrated solution from the auxiliary regenerator GX is first of all supplied to the low-pressure absorber AL, the refrigerant vapor from the low-pressure evaporator EL is absorbed, the solution absorbing the refrigerant vapor in the low-pressure absorber AL is supplied to the high-pressure absorber AH, the refrigerant vapor from the high-pressure evaporator EH is absorbed, and the diluted solution absorbing the refrigerant vapor is supplied to the auxiliary absorber AX. Also, as shown for example in FIG. 12, the absorption refrigerating machine of the present invention may be so constituted that the concentrated solution from the regenerator G is first of all supplied to the low-pressure absorber AL, the refrigerant vapor from the low-pressure evaporator EL is absorbed, the solution absorbing the refrigerant vapor in the low-pressure absorber AL is supplied to the high-pressure absorber AH, and the refrigerant vapor from the high-pressure evaporator EH is absorbed, a portion of the diluted solution mixture of the diluted solution of the high-pressure absorber AH outlet absorbing the refrigerant vapor and the diluted solution of the auxiliary absorber AX outlet is supplied to the auxiliary absorber AX, and the remainder is sent to the regenerator G.

The present application is based on the Japanese Patent Application No. 2002-280111 filed on Sep. 26, 2002 in Japan, the Japanese Patent Application No. 2002-280112 filed on Sep. 26, 2002, and the Japanese Patent Application No. 2003-166181 filed on Jun. 11, 2003. These Japanese Patent Applications are hereby incorporated in its entirety by reference into the present application.

The present application will become more fully understood from the detailed description given hereinbelow. However, the detailed description and the specific embodiment are illustrated of desired embodiments of the present invention and are described only for the purpose of explanation. Various changes and modifications will be apparent to those ordinary skilled in the art of the basic of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

BEST MODE FOR CARRYING OUT THE INVENTION

The present invention will be herein after described in detail with reference to the drawings. The embodiments of the present invention are described next, however, the scope of the present invention is not limited by these embodiments.

Figure 1:
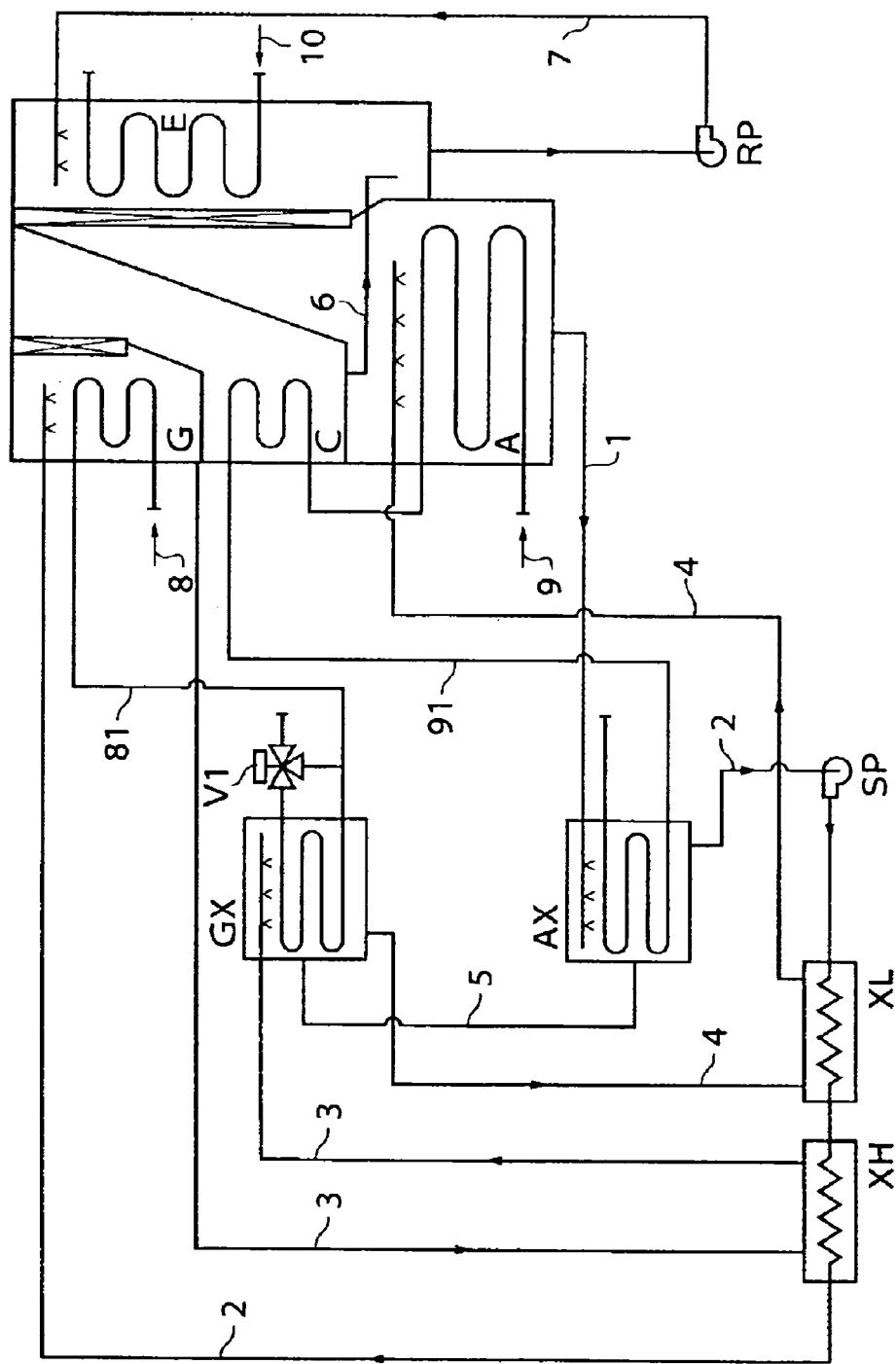
FIG. 1 is a structural flow diagram showing the absorption refrigerating machine of the first embodiment of this invention.

FIG. 1 is a structural flow diagram showing the absorption refrigerating machine of the first embodiment of this invention.

In FIG. 1, a reference symbol E is an evaporator, A is an absorber, G is a regenerator, C is a condenser, AX is an auxiliary absorber, GX is an auxiliary regenerator, XL is a low-temperature heat exchanger, XH is a high-temperature heat exchanger, SP is a solution pump, RP is a refrigerant pump, V1 is a three-way valve, the reference numerals 1 through 4 are solution flow paths, 5 is a refrigerant vapor flow path, the numerals 6, 7 are refrigerant flow paths, 8 is hot water, 9 is cooling water, and 10 is cold water.

In this embodiment, the evaporator E and the absorber A are formed in one space with an eliminator between the evaporator E and the absorber A. The regenerator G and the condenser C are formed in another separate space with another eliminator between the regenerator G and the condenser C. The auxiliary absorber AX, the auxiliary regenerator GX, the low-temperature heat exchanger XL, and the high-temperature heat exchanger XH are each formed in the separate shells.

A refrigerant pump RP is installed on the refrigerant flow path 7 for circulating the refrigerant in order to disperse the refrigerant to a tube for flow of the cold water 10 in the evaporator E.

The auxiliary absorber AX and the regenerator G are connected by the solution flow path 2 for sending the diluted solution from the auxiliary absorber AX to the regenerator G. A low-temperature heat exchanger XL and a high-temperature heat exchanger XH are placed in that order along the solution flow path 2. A solution pump SP is installed between the auxiliary absorber AX and the low-temperature heat exchanger XL.

The absorber A and the auxiliary absorber AX are connected by the solution flow path 1 for sending the diluted solution from the absorber A to the auxiliary absorber AX.

The regenerator G and the auxiliary regenerator GX are connected by the solution flow path 3 for sending the concentrated solution from the regenerator G to the auxiliary regenerator GX. The high-temperature heat exchanger XH is installed on the solution flow path 3.

The auxiliary regenerator GX and the absorber A are connected by the solution vapor flow path 4 for sending the solution from the auxiliary regenerator GX to the absorber A. The low-temperature heat exchanger XL is installed on the solution flow path 4.

The auxiliary regenerator GX and the auxiliary absorber AX are connected by the solution flow path 5 for sending the refrigerant vapor from the auxiliary regenerator GX to the auxiliary absorber AX.

Between the condenser C and the evaporator E, the refrigerant flow path 6 is disposed for sending the refrigerant liquid from the condenser C to the evaporator E.

A hot water pipe 81 for allowing the flow of hot water 8 as the heat source fluid for heating the solution is laid extending from the regenerator G to the auxiliary regenerator GX. The hot water 8 first of all flows via the hot water pipe 81 into the regenerator G, and also flows via the hot water pipe 81 into the auxiliary regenerator GX.

A three-way valve V1 for controlling the flow rate of hot water passing through the auxiliary regenerator GX is disposed on the outlet side of the auxiliary regenerator GX in the hot water pipe 81. This three-way valve V1 may be disposed on the inlet side of the auxiliary regenerator GX in the hot water pipe 81.

A cooling water pipe 91 for the flow of the cooling water 9 as the refrigerant substance for cooling the solution is laid from the absorber A to the condenser C, and to the auxiliary absorber AX. This cooling water 9 first of all flows via the cooling water pipe 91 into the absorber A, and also flows via the cooling water pipe 91 to the condenser C, and then flows to the auxiliary absorber AX.

In the absorption refrigerating machine of FIG. 1, the concentrated solution supplied to the absorber A, absorbs the refrigerant vapor from the evaporator E while being cooled by the cooling water 9, and becomes a diluted solution. The diluted solution from the absorber A is supplied from the flow path 1 to the auxiliary absorber AX, and absorbs the refrigerant vapor from the flow path 5 generated in the auxiliary regenerator GX while being cooled by the cooling water, and also becomes a low-concentration diluted solution.

The pressure of the diluted solution leaving the auxiliary absorber AX through the flow path 2 is raised by the solution pump SP and enters the low-temperature heat exchanger XL, subjected to heat exchange in the low-temperature heat exchanger XL with the concentrated solution flowing from the auxiliary regenerator GX via the flow path 4 towards the absorber A. With this heat exchange the temperature of the diluted solution rises while the temperature of the concentrated solution lowers. The high-temperature heat exchanger XH next performs heat exchange of the diluted solution with the concentrated solution flowing from the regenerator G to the auxiliary regenerator GX, and the temperature of the diluted solution rises even further, while the temperature of the concentrated solution drops.

The solution in the regenerator G is heated by the hot water 8 functioning as the heat source, generates refrigerant vapor and the solution is concentrated. The concentrated solution which is thus concentrated enters the auxiliary regenerator GX via the heating side of the high-temperature heat exchanger XH from the flow path 3, is heated by the hot water 8 functioning as the heat source to generate refrigerant vapor, and further concentrated, and supplied from the flow path 4 to the absorber A via the heating side of the low-temperature heat exchanger XL, to complete one solution cycle.

In the evaporator E, the refrigerant liquid cools the cold water 10 with the latent heat of vaporization, forms refrigerant vapor, and is absorbed into the solution in the absorber A. The refrigerant vapor generated in the regenerator G, is cooled by the cooling water 9 in the condenser C, becomes refrigerant liquid, and is supplied from the flow path 6 to the evaporator E.

Figure 15:
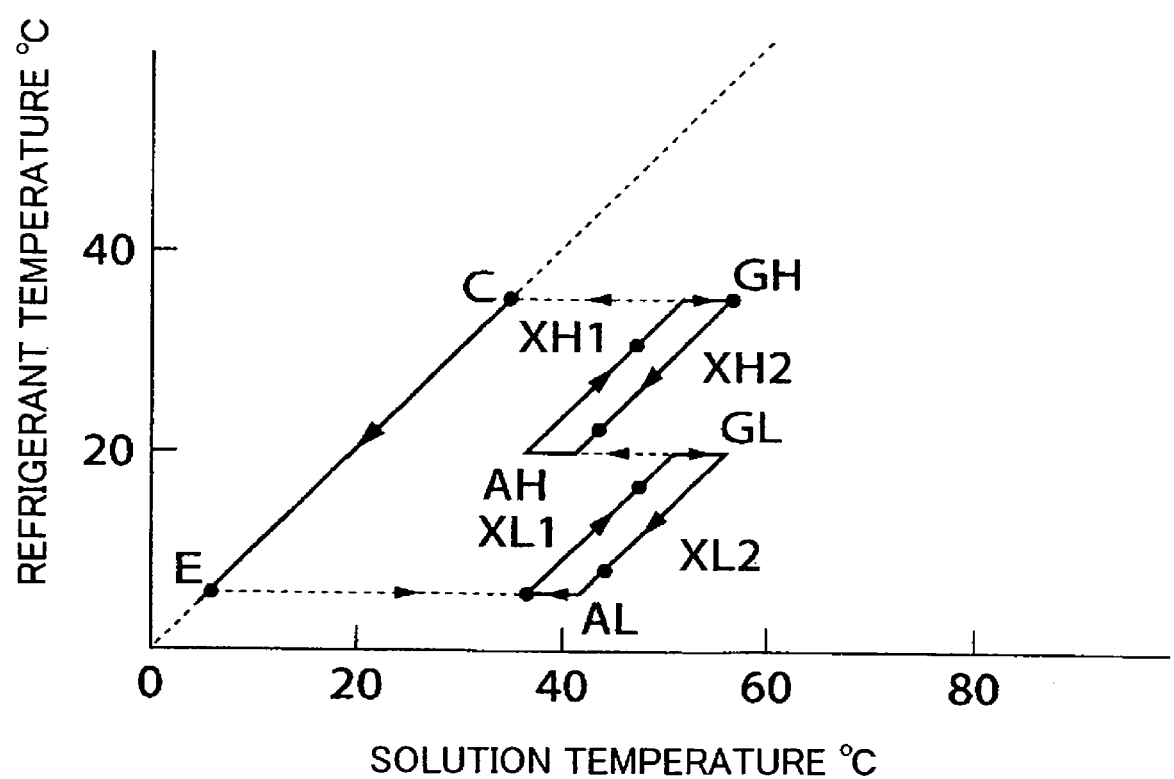
FIG. 15 is a Dühring diagram of the double-concentrating type absorption cycle.
Figure 16:
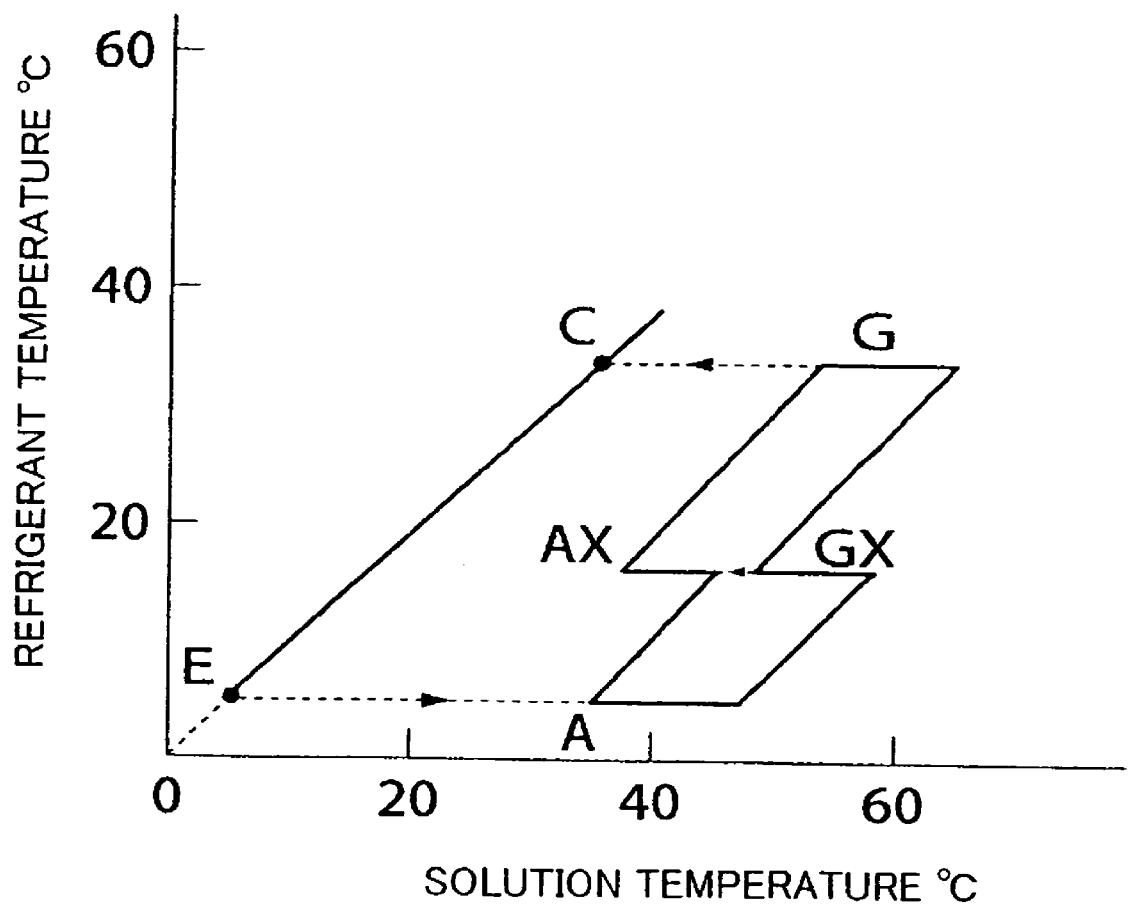
FIG. 16 is a Dühring diagram of the cycle combining two separate systems for the double-concentrating type absorption cycle of the known art.

In contrast to the solution cycle for the double-concentrating cycle of the conventional art separated into two systems (FIG. 15), this solution cycle is a single-system circulating cycle. Moreover, the heat energy in the concentrated solution heated in the auxiliary regenerator GX is recovered in the diluted solution flowing from the auxiliary absorber AX towards the regenerator G. Likewise, the heat energy in the concentrated solution heated in the generator G is further recovered in the above mentioned diluted solution.

Figure 2:
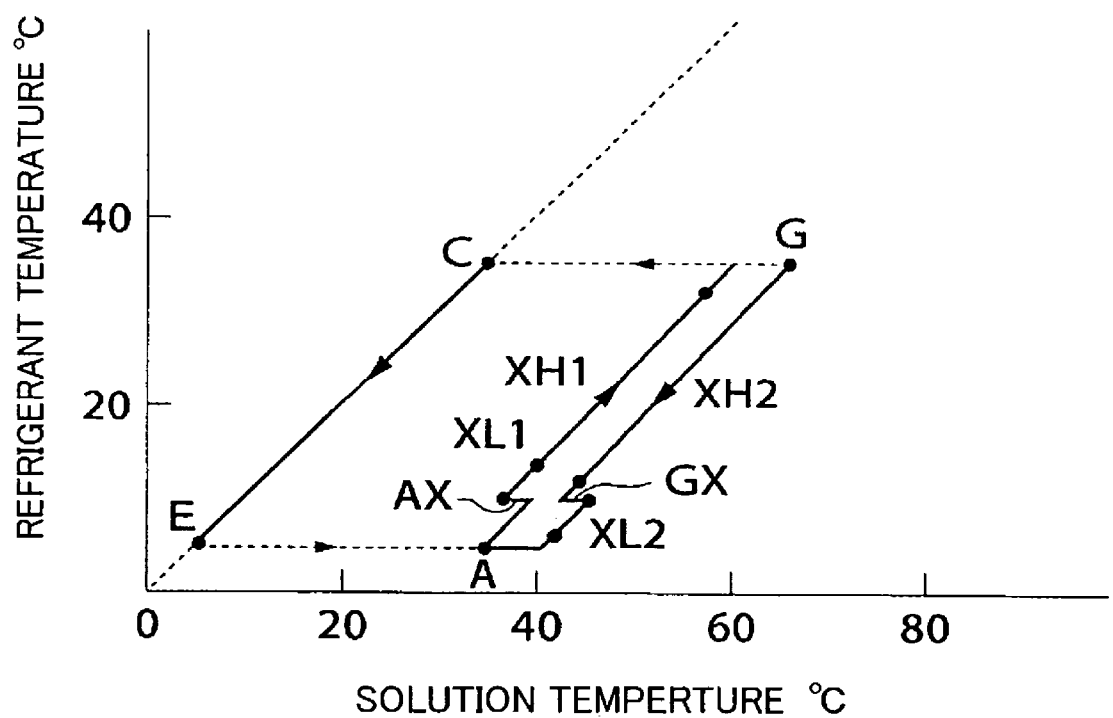
FIG. 2 is a Dühring diagram of the solution cycle of FIG. 1.

Next, the cycle in the Dühring diagram of FIG. 2 is described.

The solution cycle of FIG. 1 is shown in the Dühring diagram in FIG. 2.

In order to lower to the required hot water temperature in the present embodiment, the cycle concentration is changed using the auxiliary regenerator GX and the auxiliary absorber AX. The heat transfer area of the auxiliary regenerator GX and the auxiliary absorber AX may be set according to the corresponding hot water temperature. The figure shows an example when the heat transfer area of the auxiliary regenerator GX is set to approximately 5% of that of the regenerator G, and the heat transfer area of the auxiliary absorber AX is set to approximately 20% of that of the absorber A.

In the auxiliary regenerator GX, there is a large differential between the heat source temperature and the solution temperature so that the heat transfer area of the auxiliary regenerator GX is small. Due to this temperature relation, preferably, the inlet of the regenerator G is set to be the high-temperature side of the hot water forming the heat source, and the outlet of the regenerator G is set to be the low-temperature side of the hot water, and thus the hot water is first supplied to the regenerator G and is next supplied to the auxiliary regenerator GX.

The refrigerant vaporizes in the evaporator E, shifts between E and A on the dashed line in FIG. 2, and is absorbed in the absorber A.

The solution leaving the absorber A enters the auxiliary absorber AX with the same temperature and same concentration, absorbs the refrigerant vapor that is generated in the auxiliary regenerator GX and shifts from GX to AX in FIG. 2, and forms the diluted solution with an even lower concentration. This diluted solution passes along the heated side XL1 of the low-temperature heat exchanger XL, and is heated by the concentrated solution supplied from the auxiliary regenerator GX to the absorber A via the heating side XL2 of the low-temperature heat exchanger XL in the low-temperature heat exchanger XL. This diluted solution further passes along the heated side XH1 of the high-temperature heat exchanger XH, is heated by the concentrated solution supplied from the regenerator G to the auxiliary regenerator GX via the heating side XH2 of the high-temperature heat exchanger, and enters the regenerator G. The regenerator G discharges the quantity of the refrigerant vapor that is absorbed in the absorber A, forming a concentrated solution. This concentrated solution enters the auxiliary regenerator GX via the heating side XH2 of the high-temperature heat exchanger XH, is heated by the external heat source, discharges the quantity equal to the quantity of refrigerant absorbed in the auxiliary absorber AX, is further concentrated, and enters the absorber A via the heating side XL2 of the low-temperature heat exchanger XL.

In the present embodiment, the heat retained in the concentrated solution from the auxiliary regenerator GX towards the absorber A, is in this way recovered in the diluted solution flowing from the auxiliary absorber AX towards the regenerator G, rather than the diluted solution shifting from the absorber A towards the auxiliary absorber AX, and the heat retained in the concentrated solution flowing from the regenerator G towards the auxiliary regenerator GX is recovered. The temperature of the solution entering the absorber G can rise due to this heat recovery and the amount of heat required in the regenerator G for heating the solution can be reduced. Moreover, the temperature of the solution entering the auxiliary regenerator GX via the heating side XH2 of the high-temperature heat exchanger can be raised higher than the case where the diluted solution from the auxiliary absorber AX towards the regenerator G is not heated on the heated side XL2 of the low-temperature heat exchanger, and the amount of heat required for heating the solution in the auxiliary regenerator GX can be reduced.

Figure 3:
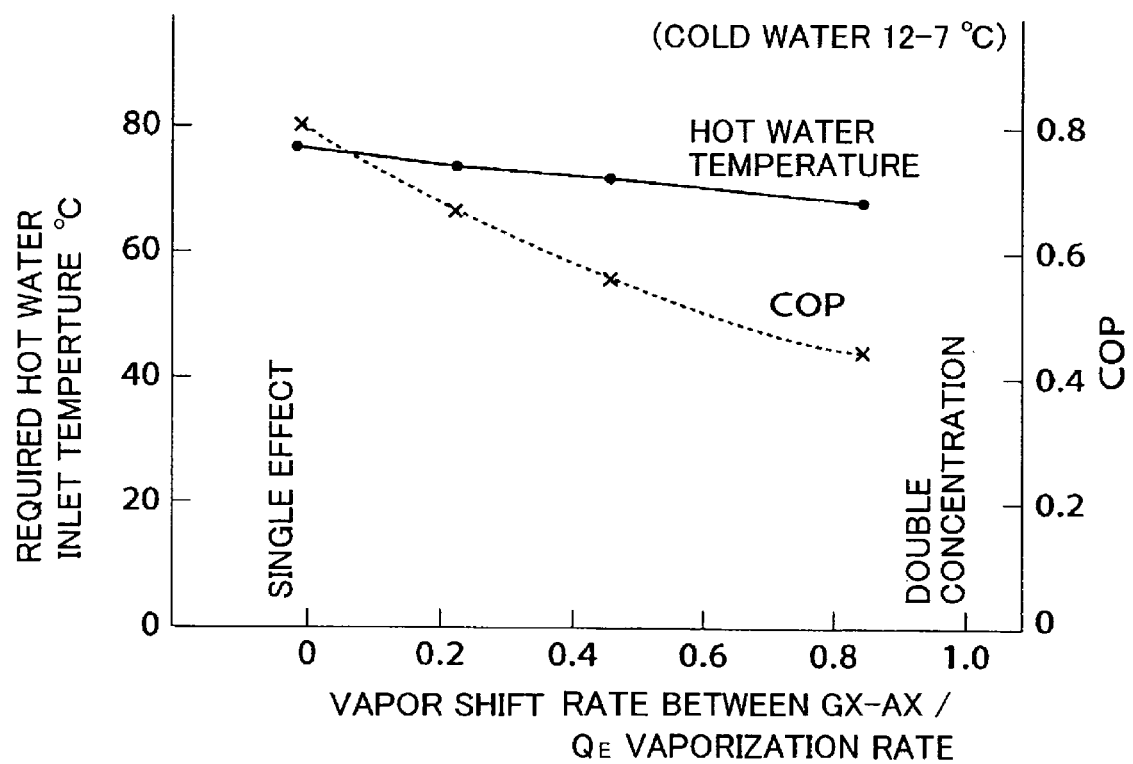
FIG. 3 is a graph showing the interrelation of the refrigerant vapor shift rate between GX-AX in FIG. 1 with the required hot water inlet temperature, and with the COP.
Figure 4:
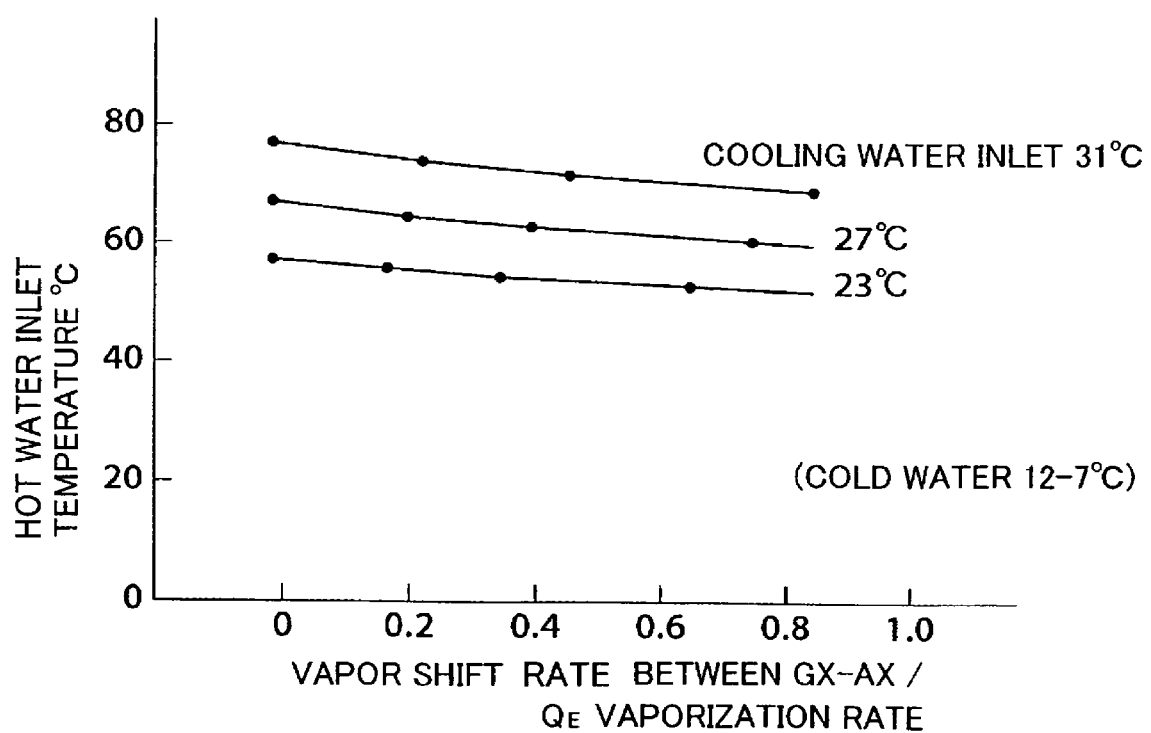
FIG. 4 is a graph showing the interrelation of the refrigerant vapor shift rate between GX-AX in FIG. 1 with the hot water inlet temperature at certain the cooling water inlet temperatures.

FIG. 3 and FIG. 4 are graphs showing the interrelation of the refrigerant vapor shift rate and the hot water inlet temperature between the auxiliary regenerator GX and the auxiliary absorber AX.

The flow rate of the refrigerant vapor generated in the auxiliary regenerator GX and absorbed in the auxiliary absorber AX corresponds to the flow rate which causes lower efficiency compared with the single effect absorption refrigerating machine. If this vapor flow rate is reduced to zero, then the efficiency is equivalent to that of the single effect absorption refrigerating machine, and if this vapor flow rate is made to be equal to evaporation rate of the evaporator E, then the efficiency is equivalent to that of the double-concentrating type. The cycle concentration changes due to the flow rate of refrigerant vapor generated in the auxiliary regenerator GX and absorbed in the auxiliary absorber AX so that the required heat source temperature changes. FIG. 3 shows this relation. In this figure, the heat transfer area of the auxiliary regenerator GX is approximately 15% of that of heat transfer area of the regenerator G, moreover the heat transfer area of the auxiliary absorber AX is approximately 50% of that of the absorber A, so limits are applied to the heat transfer capability of the regenerator G to change the flow rate of refrigerant vapor.

If the heat source temperature for example is about 65 to 70 degrees Celsius, then the flow rate of refrigerant vapor shifted between the auxiliary regenerator GX and auxiliary absorber AX may be half the flow rate vaporized in the evaporator E. Therefore, when an absorption refrigerating machine is designed under these conditions, the auxiliary regenerator GX and auxiliary absorber AX may both be respectively less than, or equal to half the size of the regenerator G and absorber A, so that a more compact body can be employed than when using the double-concentrating type absorption refrigerating machine Furthermore, the efficiency can be improved.

Up until the heat transfer area of the auxiliary regenerator GX reaches one-third of that of the generator G or in particular approximately 20%, and the heat transfer area of the auxiliary absorber AX reaches two-thirds of that of the absorber A or in particular approximately 60%, the concentration at the absorber outlet is lower than the concentration at the regenerator outlet, and in most cases, the efficiency is better than that of the full double-concentrating type absorption refrigerating machine whose cycles are separate.

When the temperature of the cooling water drops, the solution concentration required for obtaining the same cold water temperature drops, and the heat source temperature required for the solution concentration drops. FIG. 4 shows the hot water temperature required for the case in which the cooling water temperature changes. Therefore, even if the heat source temperature that can be supplied is the same, when the cooling water temperature has dropped, the flow rate of refrigerant vapor generated in the auxiliary regenerator GX and absorbed in the auxiliary absorber AX can be reduced, and the efficiency can be improved.

The flow rate of refrigerant vapor generated in the auxiliary regenerator GX and absorbed in the auxiliary absorber AX can be adjusted if for example a three-way valve V1 as shown in FIG. 1, is disposed for controlling the flow rate of hot water supplied to the auxiliary regenerator GX. Also, a portion or all of the solution flow rate to the auxiliary regenerator GX can be bypassed to change the flow rate of generated vapor, or a portion or all of the solution flow rate to the auxiliary absorber AX can be bypassed to permit changing the flow rate of absorbed vapor. The flow rate of cooling water to the auxiliary absorber AX may also be changed.

In the present embodiment, the efficiency can be continuously changed, from that of the double-concentrating cycle to that of the single effect absorption cycle by controlling the flow rate of refrigerant vapor generated in the auxiliary regenerator GX and absorbed in the auxiliary absorber AX. This can be effectively done to increase the efficiency when the hot water temperature has risen or the cooling water temperature has dropped.

Figure 5:
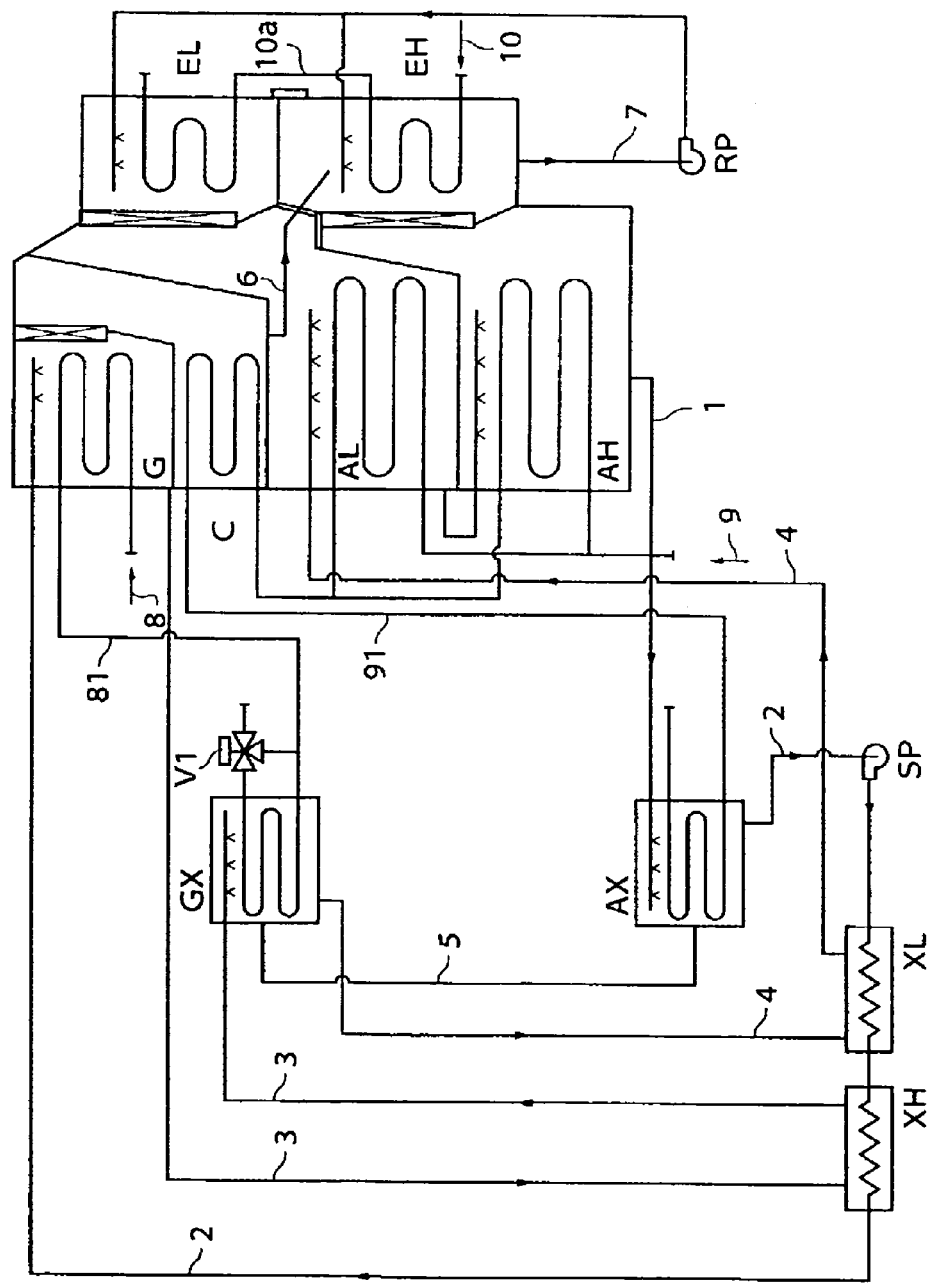
FIG. 5 is a structural flow diagram showing the absorption refrigerating machine of the second embodiment of this invention.

FIG. 5 is a structural flow diagram showing the absorption refrigerating machine of the second embodiment of this invention.

In FIG. 5, reference numerals identical to those in FIG. 1 have the same meaning. In FIG. 5, in order to utilize the difference in the cold water inlet/outlet temperatures to further improve efficiency, the absorber A of the above absorption refrigerating machine is subdivided into a low-pressure absorber AL and a high-pressure absorber AH, and the evaporator E is subdivided into a low-pressure evaporator EL and a high-pressure evaporator EH. The low-pressure absorber AL and the low-pressure evaporator EL are formed in one space with an eliminator between the low-pressure absorber AL and the low-pressure evaporator EL. The high-pressure absorber AH and the high-pressure evaporator EH are formed in another separate space with an eliminator between the high-pressure absorber AH and the high-pressure evaporator EH.

The cooling water pipe 91 is laid to allow parallel flow into the low-pressure absorber AL and the high pressure absorber AH. The cold water pipe 10a is laid to allow flow in series from the high-pressure evaporator EH to the low-pressure evaporator EL in this order.

The solution flow path 4 is laid connecting to the low-pressure absorber AL, from the auxiliary regenerator GX via the low-temperature heat exchanger XL. The solution flow path 4 is laid so as to supply the solution from the low-pressure absorber AL to the high-pressure absorber AH.

In the present embodiment, the cold water 10 is first of all supplied to the high-pressure evaporator EH, and the cooled cold water 10 is next supplied to the low-pressure evaporator EL, and the concentrated solution from the auxiliary regenerator GX is first of all supplied to the low-pressure absorber AL, and absorbs the refrigerant vapor from the low-pressure evaporator EL, and the solution absorbing the refrigerant vapor in the low-pressure absorber AL is supplied to the high-pressure absorber AH, and absorbs the refrigerant vapor from the high-pressure evaporator EH.

The solution absorbing the refrigerant vapor in the high-pressure absorber AH, passes from the flow path 1 through the auxiliary absorber AX, and is fed from the flow path 2 to the regenerator G via the low-temperature heat exchanger XL and the high-temperature heat exchanger XH and the solution concentrated in the regenerator G is fed from the flow path 3 via the high-temperature heat exchanger XH to the auxiliary regenerator GX, and further from the flow path 4 via the low-temperature heat exchanger XL to the low-pressure absorber AL.

Figure 6:
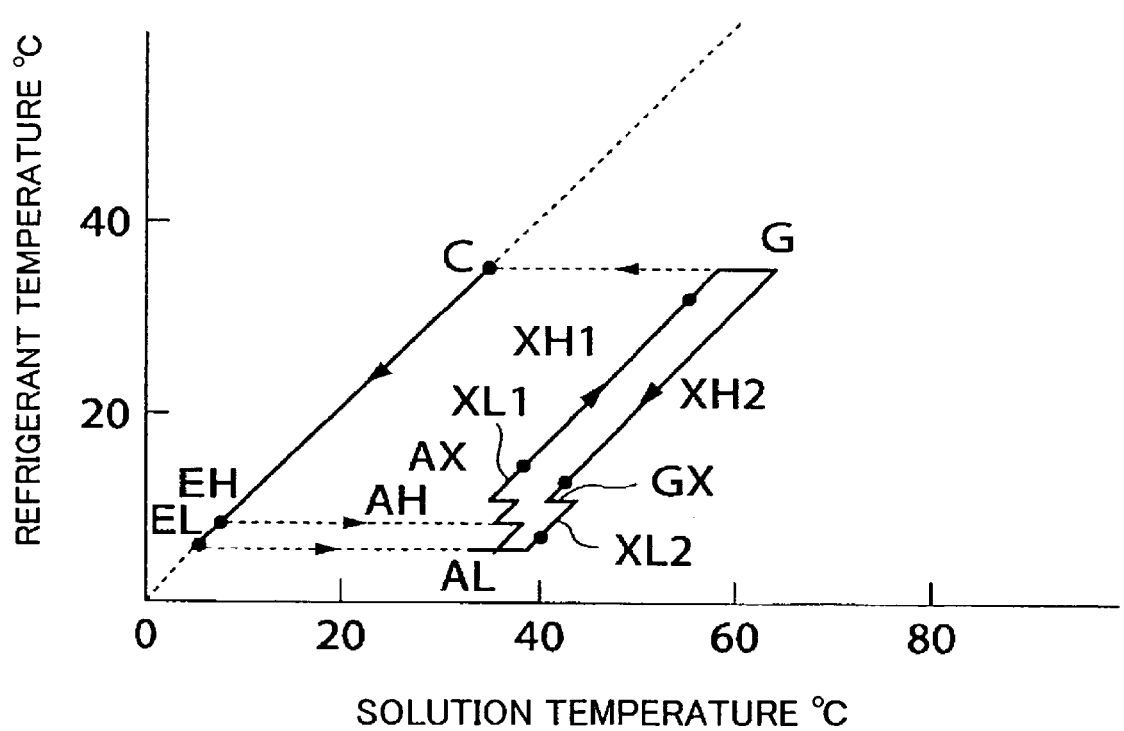
FIG. 6 is a Dühring diagram of the solution cycle of FIG. 5.

FIG. 6 is a Dühring diagram showing the solution cycle in regard to FIG. 5. The saturation temperature of the high-pressure evaporator EH is increased, and the concentration of the diluted solution leaving the high-pressure absorber AH is decreased.

In this way, the flow rate of refrigerant required for further decreasing the concentration in the auxiliary absorber AX can be reduced, and the efficiency can be increased compared to the case of FIG. 1.

Figure 7:
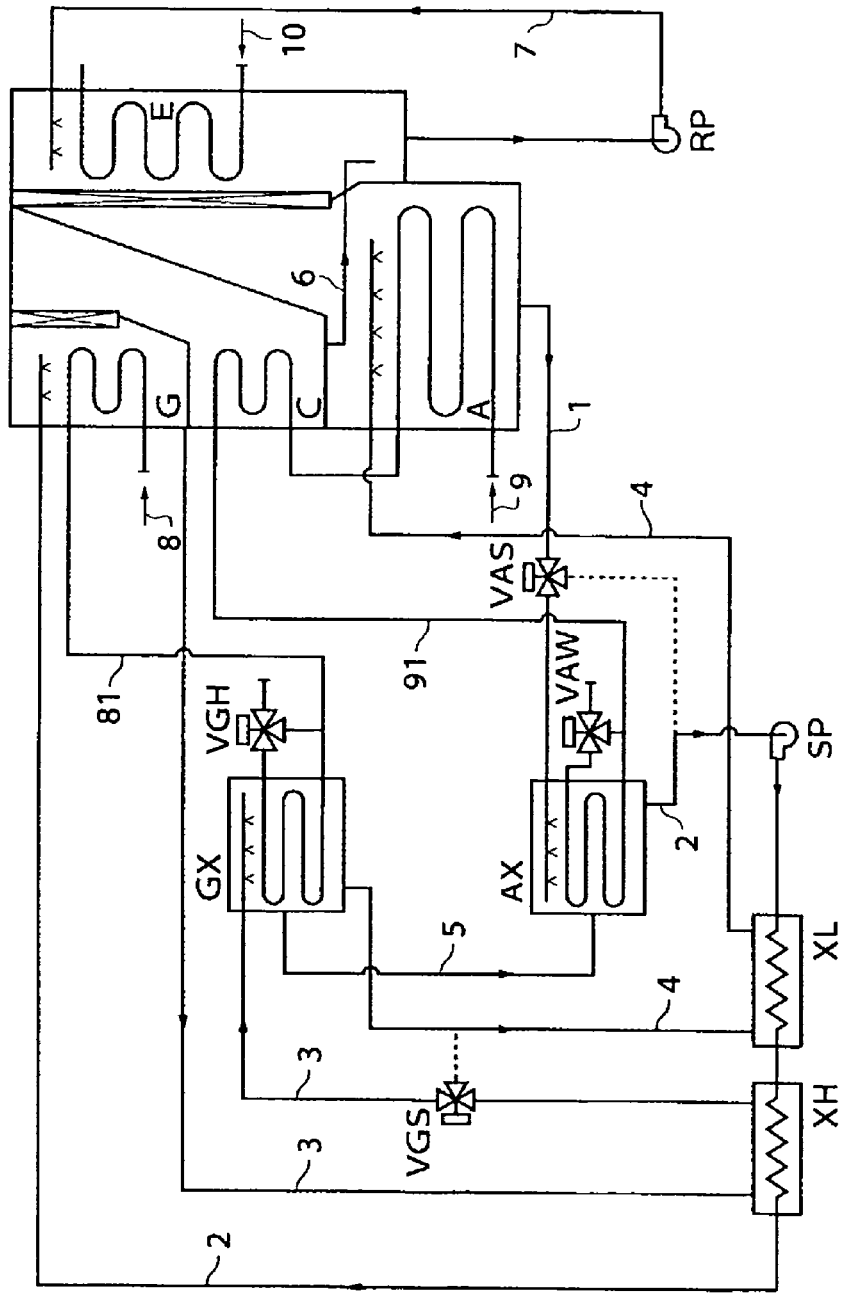
FIG. 7 is a structural flow diagram showing the absorption refrigerating machine of the third embodiment of this invention.

FIG. 7 is a structural flow diagram showing the absorption refrigerating machine of the third embodiment of this invention.

In FIG. 7, the point differing from the first embodiment described in FIG. 1 is that the embodiment contains the flow rate control valves VGH, VGS, VAW, VAS. In the present embodiment, these are three-way valves.

The flow rate control valve VGH is placed on the hot water pipe 81 in the same manner as the three-way valve V1 described in the first embodiment.

The flow rate control valve VGS is placed on the solution flow path 3 connecting the high-temperature heat exchanger XH and the auxiliary regenerator GX. One port of the three-way valve VGS connects to the solution flow path 4 that connects the auxiliary regenerator GX and the low-temperature heat exchanger XL.

The flow rate control valve VAW is disposed on the outlet side of the auxiliary absorber AX in the cooling water pipe 91. The three-way valve VAW may be disposed on the inlet side of the auxiliary absorber AX in the cooling water pipe 91.

The flow rate control valve VAS is placed on the solution flow path 1 connecting the absorber A and the auxiliary absorber AX. One port of the three-way valve VAS connects, between the solution pump SP and the auxiliary absorber AX, to the solution flow path 2 for connecting the auxiliary absorber AX and the low-temperature heat exchanger XL.

The Dühring cycle of the present embodiment is identical with that described in FIG. 1.

Figure 8:
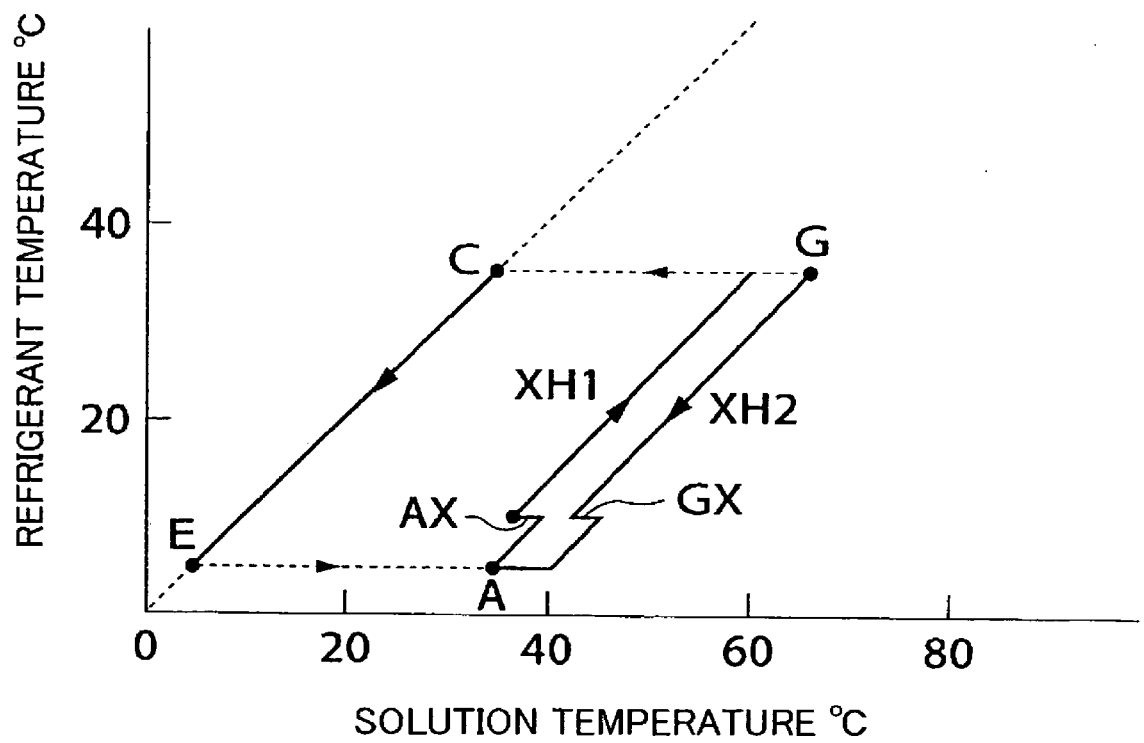
FIGS. 8(a) and 8(b) are a Dühring diagrams of the solution cycle of FIG. 7 partially modified.
Figure 8:
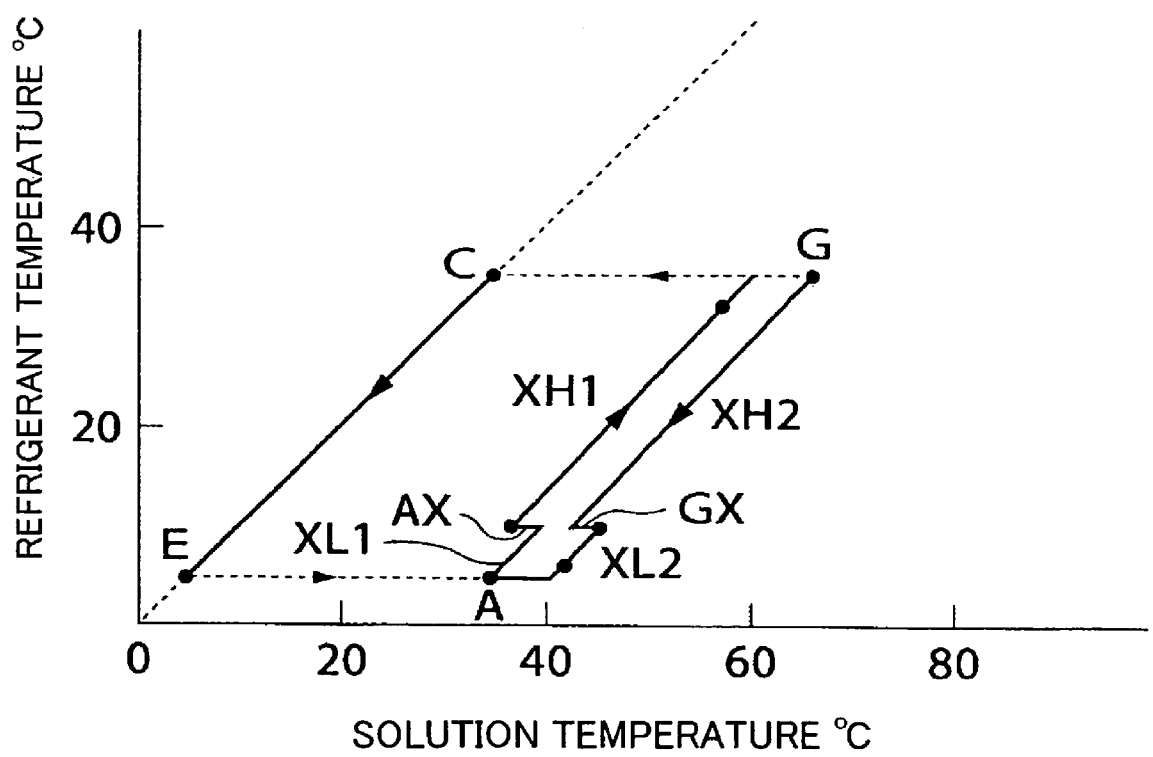

FIG. 8 shows the Dühring cycle for the modified example of the third embodiment. As shown in FIG. 8(*a*), although there is some amount of sacrifice in efficiency, the low-temperature heat exchanger XL is omitted and a compact design can be attained. Also, as shown in FIG. 8(*b*), the heated side XL1 of the low-temperature heat exchanger XL can make diluted solution from the absorber towards the auxiliary absorber.

The interrelation of the refrigerant vapor shift rate and the hot water inlet temperature and between the auxiliary regenerator GX auxiliary absorber AX is the same as described in the first embodiment.

The flow rate of refrigerant vapor generated in the auxiliary regenerator GX and absorbed in the auxiliary absorber AX can be adjusted the same as in the first embodiment if, for example as shown in FIG. 7, a three-way valve VGH is provided to adjust the flow rate of hot water supplied to the auxiliary regenerator GX. Also, the solution valve VGS shown in FIG. 7, can limit the flow rate of generated vapor by bypassing a portion or all of the solution flow rate to the auxiliary regenerator GX as shown by the dashed line, and the flow rate of refrigerant vapor shifting between GX and AX can be varied. Also, in FIG. 7, by using the cooling water valve VAW, the flow rate of cooling water to the auxiliary absorber AX can be changed, or by using the solution valve VAS in FIG. 7, a portion or all of the solution flow rate to the auxiliary absorber AX can be bypassed to change it, and therefore, the flow rate of absorbed vapor can be limited, to allow changing the flow rate of refrigerant vapor shifting between GX and AX.

In the present embodiment, the flow rate of refrigerant vapor generated in the auxiliary regenerator GX and absorbed in the auxiliary absorber AX can be adjusted so that the efficiency can be continuously changed from that of the double-concentrating cycle absorption to that of the single effect absorption cycle. This can be effectively done to increase the efficiency when the hot water temperature rises or the cooling water temperature drops.

Figure 9:
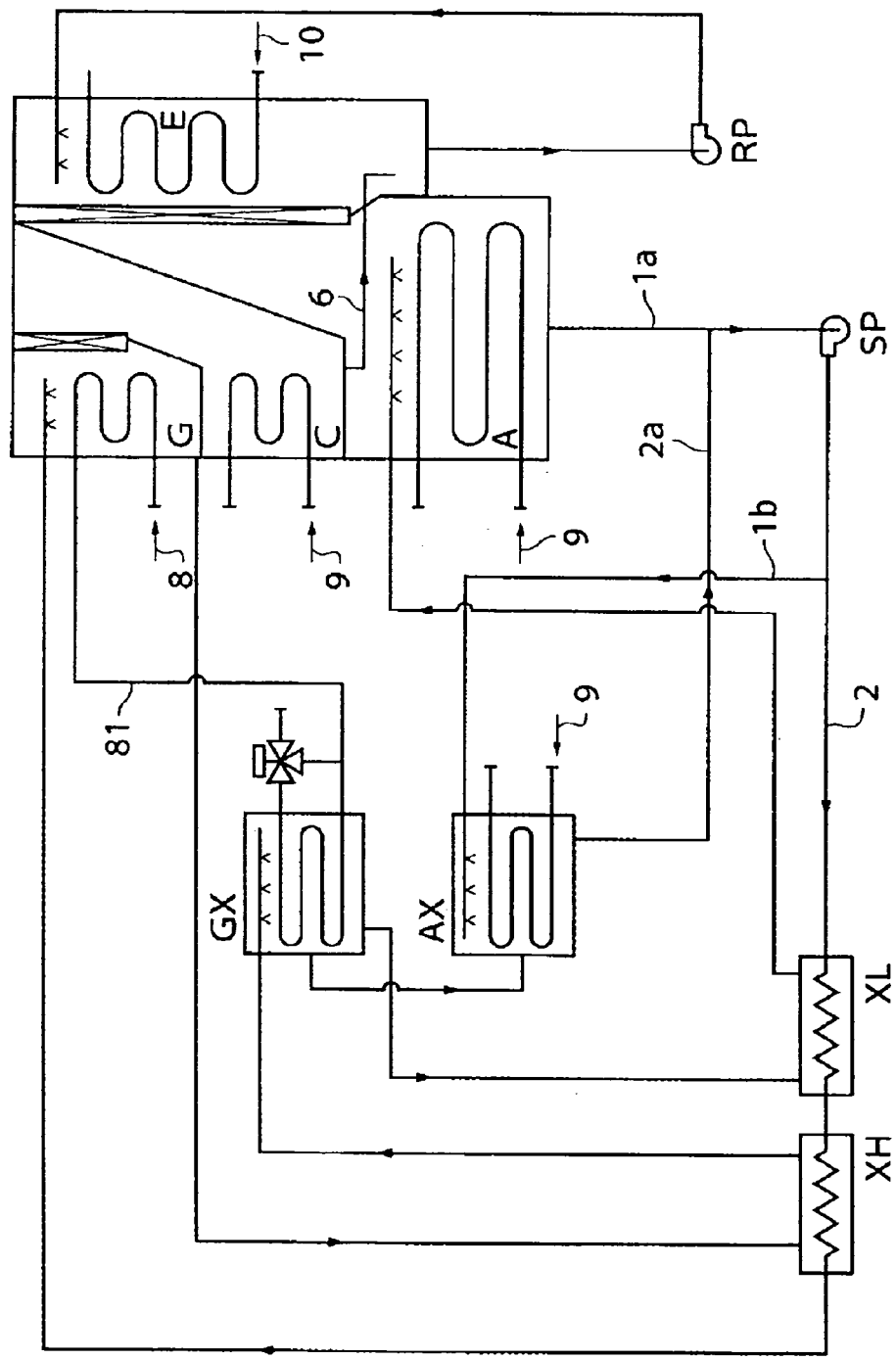
FIG. 9 is a schematic structural diagram showing the absorption refrigerating machine of the fourth embodiment of this invention.

FIG. 9 is a schematic structural diagram showing the absorption refrigerating machine of the fourth embodiment of this invention.

As shown in FIG. 9, the refrigerating machine of the present embodiment is constituted, including an evaporator E, an absorber A, a regenerator G, a condenser C, an auxiliary absorber AX, an auxiliary regenerator GX, a low-temperature heat exchanger XL, and a high-temperature heat exchanger XH.

The point where the present embodiment differs from the first embodiment is that the solution flow path 1*a* from the absorber A, merges with the solution flow path 2*a* from the auxiliary absorber AX to flow into the solution pump SP, and that the solution flow path 1*b* to the auxiliary absorber AX branches from the solution flow path 2 from the outlet of the solution pump SP.

In this type of structure, the concentrated solution supplied to the absorber A absorbs refrigerant vapor from the evaporator E while being cooled by the cooling water 9 and becomes diluted solution. The diluted solution from the absorber A, along with the diluted solution from the auxiliary absorber AX are pressurized with the solution pump SP and forms the solution mixture. A portion of the mixed diluted solution is supplied to the auxiliary absorber AX, and absorbs the refrigerant vapor generated in the auxiliary regenerator GX while being cooled by the cooling water 9, and becomes a further diluted solution with a lower concentration.

The remainder of the diluted solution mixture whose pressure was raised in the solution pump SP enters the low-temperature heat exchanger XL, and heat exchange with the concentrated solution from the auxiliary regenerator GX towards the absorber A is performed by the low-temperature heat exchanger XL, the temperature of the diluted solution mixture rises while the temperature of the concentrated solution drops. The diluted solution mixture then enters the high-temperature heat exchanger XH, heat exchange with the concentrated solution from the regenerator G to the auxiliary regenerator GX is performed by the high-temperature heat exchanger XH, and the temperature of the diluted solution mixture rises even further while the temperature of the concentrated solution drops. The solution in the regenerator G is heated by the hot water functioning as the heat source, generates refrigerant vapor and is concentrated. The concentrated solution which is thus concentrated enters the auxiliary regenerator GX via the heating side of the high-temperature heat exchanger XH, and is heated by the hot water of the heat source and generates refrigerant vapor, is further concentrated, and supplied into the absorber A via the heating side of the low-temperature heat exchanger XL, to complete one solution cycle. In the evaporator E, the refrigerant liquid cools the cold water with the latent heat of vaporization, changes it to refrigerant vapor, and the refrigerant vapor is absorbed into the solution of the absorber A. The refrigerant vapor generated in the regenerator G is cooled in the condenser C with the cooling water 9, and becomes refrigerant liquid and is supplied to the evaporator E.

In contrast to the solution cycle for the double-concentrating cycle of the conventional art that is separated into two systems (FIG. 15), this solution cycle is a single-system circulating cycle. Moreover, in this structure, the heat energy in the concentrated solution heated in the auxiliary regenerator GX is recovered in the diluted solution from the auxiliary absorber AX towards the regenerator G. This structure is also characterized in that the heat energy in the concentrated solution heated in the regenerator G is further recovered in the above mentioned diluted solution.

In this cycle between the conventional single effect and the double-concentrating types, the solution circulating system requires a solution pump for the absorber outlet and a solution pump for the auxiliary absorber outlet. A control to balance the flow rates of the solution entering and leaving the auxiliary absorber is also required.

In the cycle of the present embodiment, the solution from the auxiliary absorber AX is not sent to the regenerator G, rather the solution is sent from the auxiliary absorber AX to the outlet side of the absorber A which is at a lower pressure so that no solution pump is required at the outlet of the auxiliary absorber AX.

The outlet of the auxiliary absorber AX may be used simply for the outflow of solution so that no special flow rate balance control is needed and a compact design can be attained.

Figure 11:
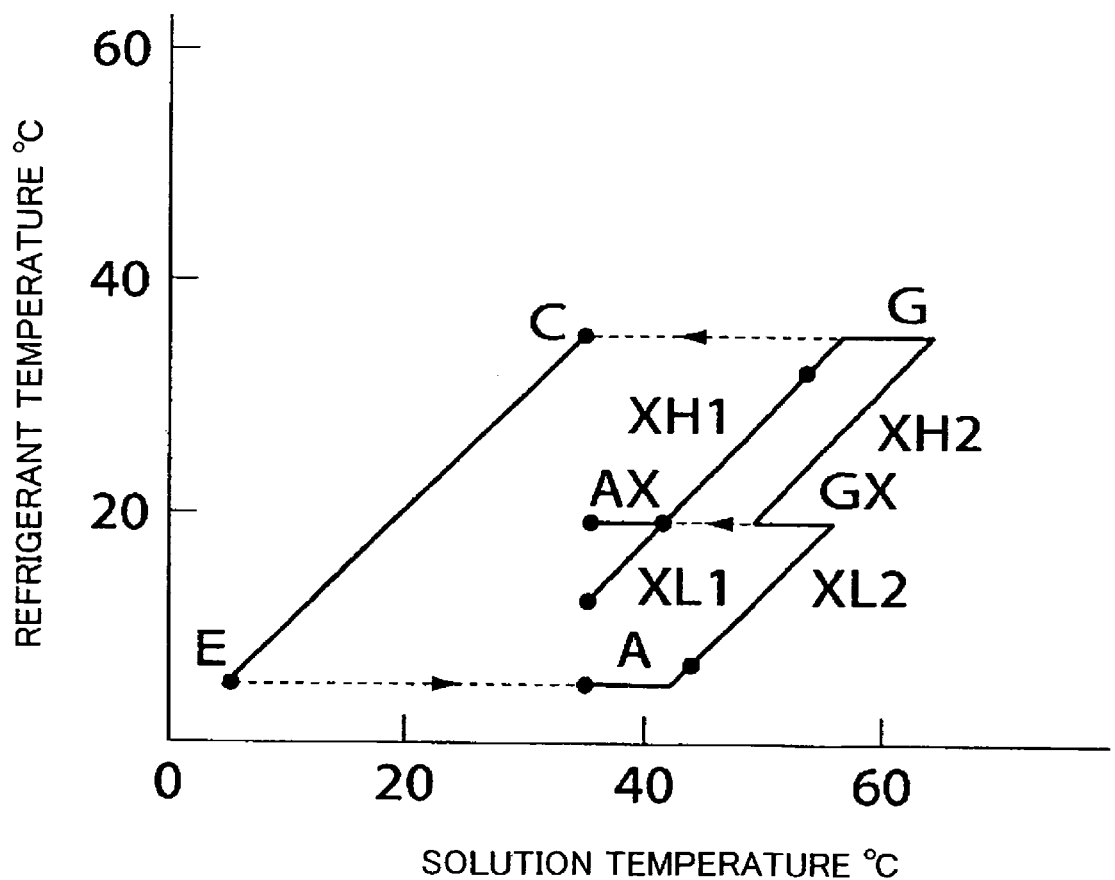
FIG. 11 is a Dühring diagram of the solution cycle with respect to FIG. 9.

FIG. 11 is a cycle on a Dühring diagram and shows the solution cycle of FIG. 9 on the Dühring diagram.

In the refrigerant vapor shifting rate between the auxiliary regenerator GX and auxiliary absorber AX, the refrigerant vapor flow rate generated in the auxiliary regenerator GX and absorbed in the auxiliary absorber AX corresponds to an efficiency drop from the efficiency of the single effect absorption refrigerating machine. If this vapor flow rate is reduced to zero, then the efficiency is equivalent to that of a single-effect type, and if this vapor flow rate is made to be equal to that evaporated in the evaporator E, then the efficiency is equivalent to that of a double-concentrating type.

In other words, when the flow rate of refrigerant vapor generated in the auxiliary regenerator GX and absorbed in the auxiliary absorber AX is decreased, the efficiency of the refrigerating machine rises. However, when the temperature of the cooling water is high, the concentration of the solution at the outlet of the auxiliary absorber increases, also there is no drop in the condensation temperature, so the heat source temperature required in the regenerator becomes higher. When the temperature of the cooling water drops, the solution concentration at the outlet of the auxiliary absorber also drops and the condensation temperature becomes lower, so that the heat source temperature required in the regenerator can be lowered. The flow rate of refrigerant vapor generated in the auxiliary regenerator GX and absorbed in the auxiliary absorber AX may also be controlled based on the cooling water temperature or a physical quantity equivalent to the cooling water temperature.

Figure 10:
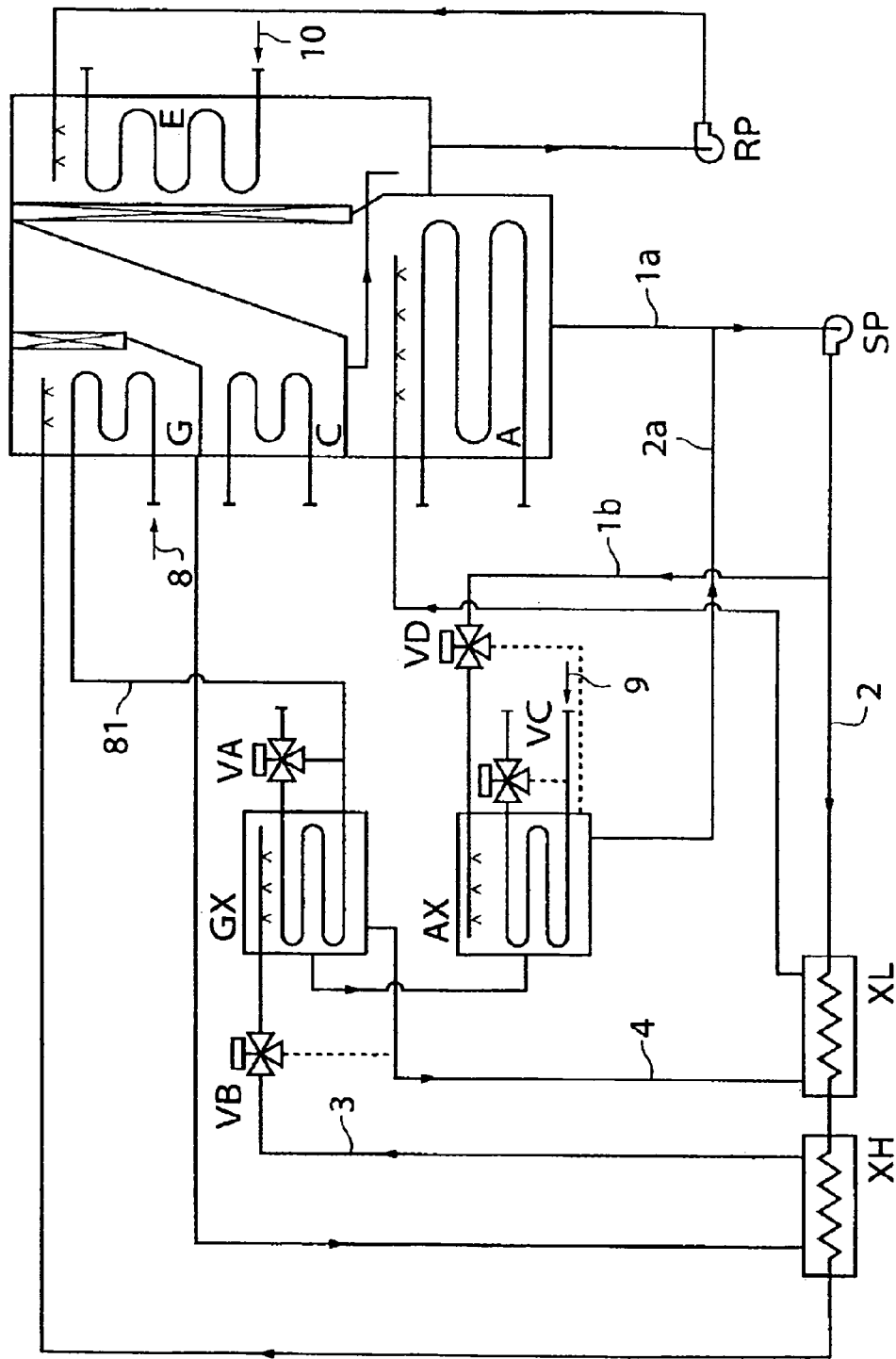
FIG. 10 is a schematic structural diagram showing the absorption refrigerating machine of the fifth embodiment of this invention.

FIG. 10 is a schematic structural diagram showing the fifth embodiment as a modification of the structure in FIG. 9. The absorption refrigerating machine of the present embodiment includes a method for controlling the flow rate of the refrigerant vapor generated in the auxiliary regenerator GX and absorbed in the auxiliary absorber AX.

The present embodiment includes a heating rate control in the auxiliary regenerator GX (heat source introduction rate control to GX by the three-way valve VA at GX inlet in FIG. 10, or solution spray flow rate control to GX by VB of FIG. 10), or an absorption performance control in the auxiliary absorber AX (cooling water flow rate control to AX by VC of FIG. 10, or solution spray flow rate control to AX by VD of FIG. 10).

In this figure, the valve VA is placed in the hot water pipe 81 in the same manner as the three-way valve V1 described in the first embodiment.

The three-way valve VD is placed on the solution flow 1b from the solution pump SP to the auxiliary absorber AX. One port of the three-way valve VD is connected to the auxiliary absorber AX. The port of the three-way valve VD may be connected to the suction side of the solution pump SP rather than the auxiliary absorber AX, or in other words, may be connected to the solution flow path 2a or the solution flow path 1a.

The three-way valve VC is disposed on the outlet side of the auxiliary absorber AX in the cooling water pipe. The three-way valve VC may be disposed on the inlet side of the auxiliary absorber AX in the cooling water pipe.

The three-way valve VB is placed on the solution flow path 3 connecting the high-temperature heat exchanger XH and the auxiliary regenerator GX. One port of the three-way valve VB connects to the solution flow path 4 connecting the auxiliary regenerator GX and the low-temperature heat exchanger XL.

In the present embodiment, when the amount of refrigerant vapor generated in the auxiliary regenerator GX and absorbed in the auxiliary absorber AX is reduced, the heat source quantity required by the auxiliary regenerator GX becomes small and the required temperature also decreases. However, the heat source temperature required by the regenerator G remains high. The heat source substance is preferably supplied first of all to the regenerator G, and next supplied to the auxiliary regenerator GX. In other words, a high heat source temperature can be utilized on the regenerator G side so the efficiency can be easily raised.

When the amount of refrigerant vapor generated in the auxiliary regenerator GX and absorbed in the auxiliary absorber AX is increased, the heat source quantity becomes large, and the temperature at the heat source outlet drops. However, when the amount of refrigerant vapor is decreased, the heat source quantity becomes small, and the temperature at the heat source outlet rises. In such cases, control is preferably performed by control valves by setting the heat source temperature (heat source outlet temperature) to a target value to control the refrigerant vapor generated in the auxiliary regenerator GX and absorbed in the auxiliary absorber AX.

While the heat source is circulating in the absorption refrigerating machine and the heat source point when the heat source outlet temperature drops, the temperature also drops at the heat source inlet so that a target value may be set for the heat source inlet rather than the heat source outlet, and a position for detecting the heat source temperature need not be specified. The target is generally the heat source outlet temperature or the heat source inlet temperature.

Figure 12:
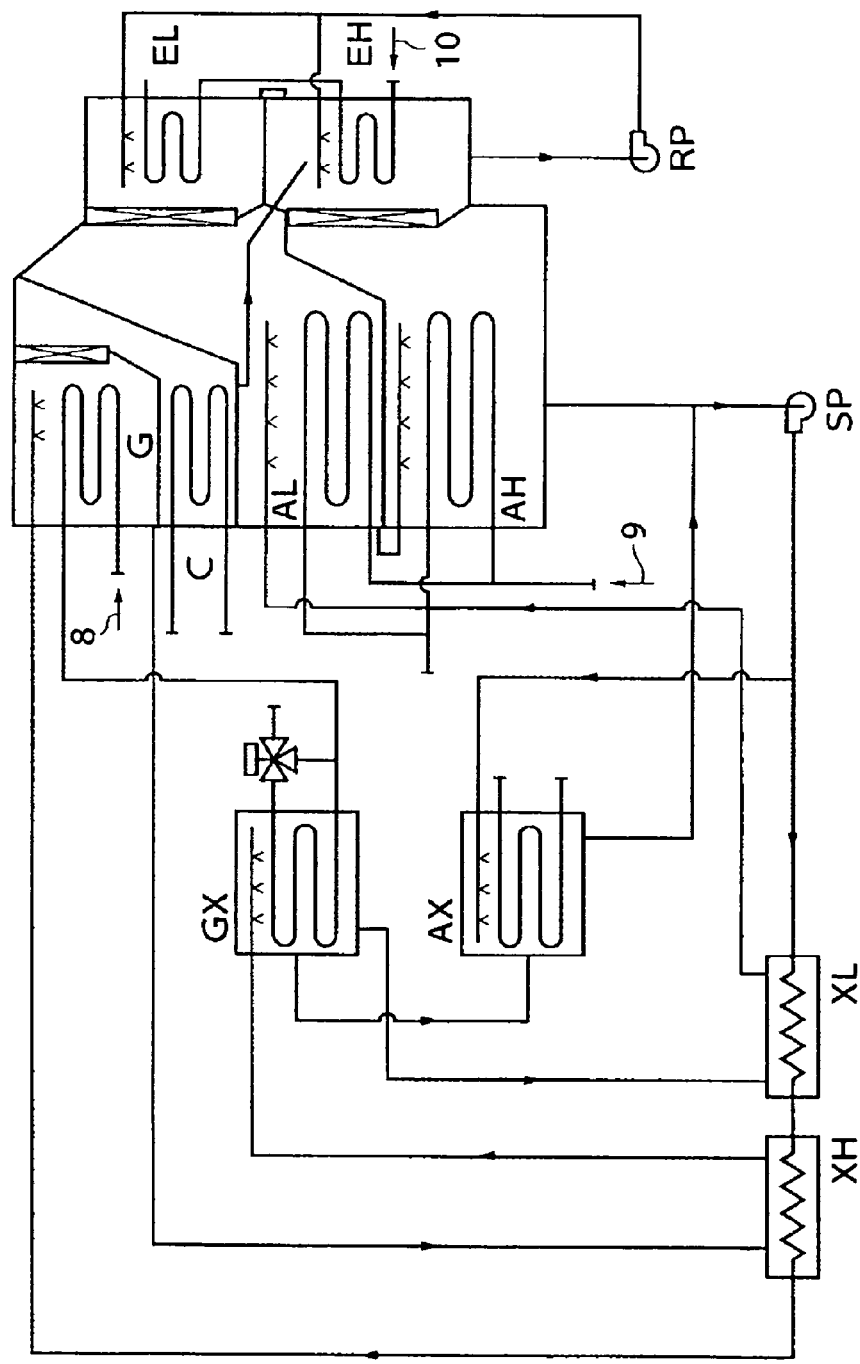
FIG. 12 is a schematic structural diagram showing the absorption refrigerating machine of the sixth embodiment of this invention.

FIG. 12 is a schematic structural diagram showing the absorption refrigerating machine of the sixth embodiment of this invention. The present embodiment is a modified example of the fourth embodiment.

As shown in FIG. 12, the differential between the cold water inlet and outlet temperatures is utilized in the same manner as in the second embodiment, and in order to further raise efficiency, the absorber A of the absorption refrigerating machine is subdivided into a low-pressure absorber AL and a high-pressure absorber AH, and the evaporator E is subdivided into a low-pressure evaporator EL and a high-pressure evaporator EH. The cold water is first of all supplied to the high-pressure evaporator EH, and the cooled cold water next is supplied to the low-pressure evaporator EL, and the concentrated solution from the auxiliary regenerator GX is first of all supplied to the low-pressure absorber AL, the refrigerant vapor from the low-pressure evaporator EL is absorbed, and the solution, after absorbing the refrigerant vapor in the low-pressure absorber AL, is supplied to the high-pressure absorber AH, and the refrigerant vapor from the high-pressure evaporator EH is absorbed.

Figure 13:
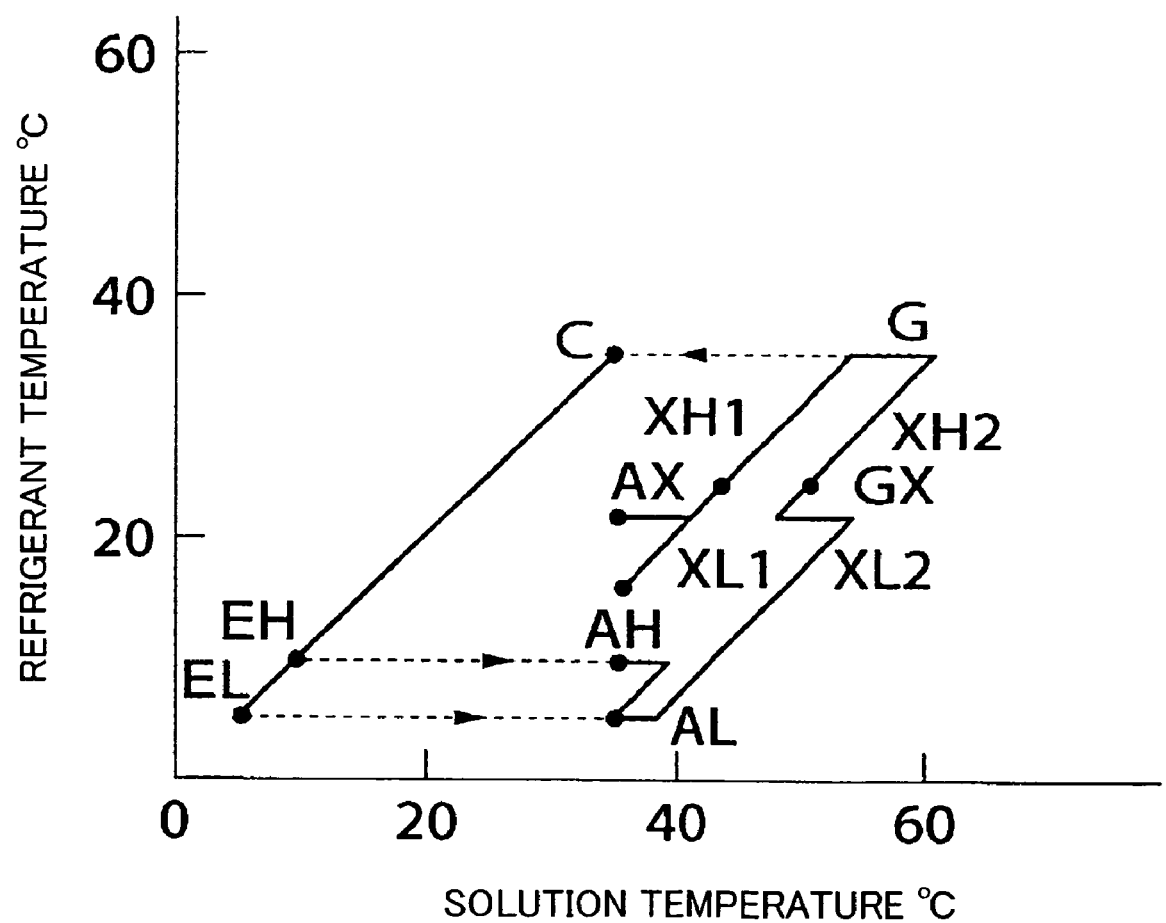
FIG. 13 is a Dühring diagram of the solution cycle with respect to FIG. 12.
Figure 14:
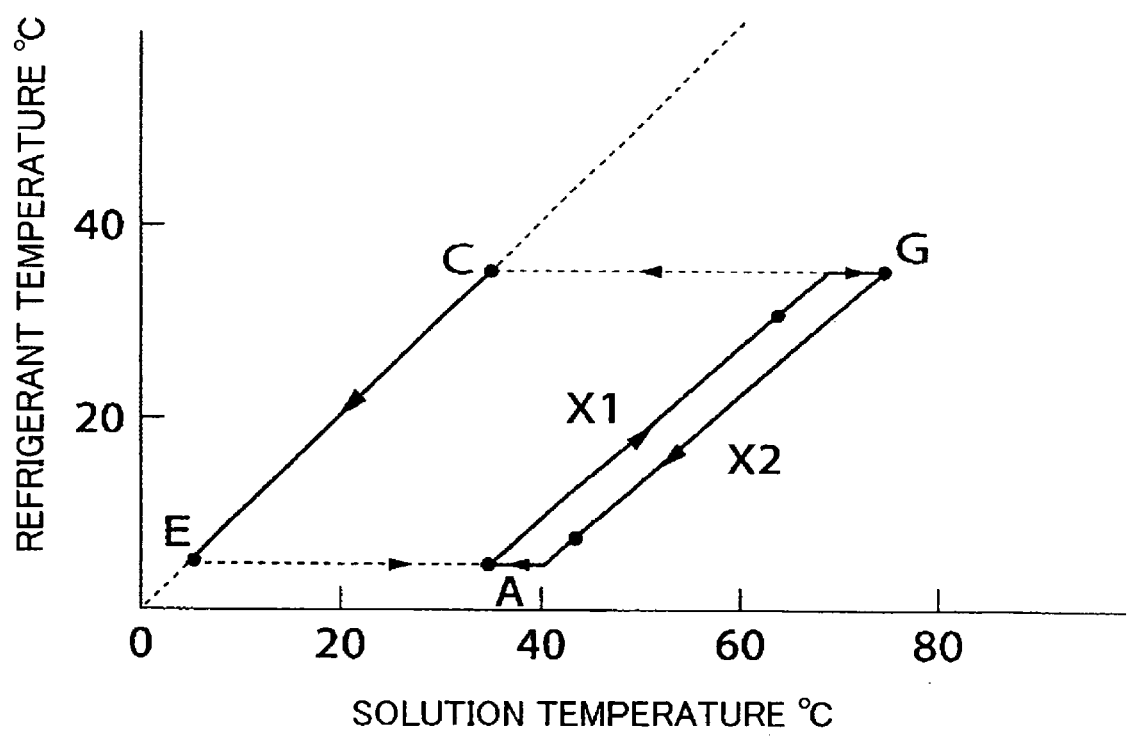
FIG. 14 is a Dühring diagram of the single effect absorption cycle.

FIG. 13 is a Dühring diagram of the solution cycle with respect to FIG. 12. As shown in the diagram, the saturation temperature of the high-pressure evaporator EH rises, and the concentration of the diluted solution leaving the high-pressure absorber AH lowers. The flow rate required for lowering further the concentration in the auxiliary absorber AX can in this way be reduced, and the efficiency can be increased compared to the case of FIG. 9.

A method for flowing cooling water, where the path branches at the cooling water inlet, and one branch flows from the condenser to the absorber, while the other branch flows to the auxiliary absorber, is preferable because the required hot water temperature is low.

In the absorption refrigerating machine of the embodiment of the present invention as described above, the absorption refrigerating machine includes a regenerator, a condenser, an absorber, an evaporator, an auxiliary regenerator and auxiliary absorber, heats the concentrated solution from the regenerator in the auxiliary regenerator, generates refrigerant vapor, and further concentrates the solution, and while cooling the diluted solution from the absorber in the auxiliary absorber, absorbs the refrigerant vapor from the auxiliary regenerator, and includes a low-temperature heat exchanger for performing heat exchange between the concentrated solution supplied from the auxiliary regenerator to the absorber and the diluted solution supplied from the auxiliary absorber to the regenerator, and includes a high-temperature heat exchanger for heating the diluted solution leaving from the low-temperature heat exchanger and sent to the regenerator, with the concentrated solution supplied from the regenerator to the auxiliary regenerator.

The absorption refrigerating machine may be constructed such that the absorber is subdivided into a low-pressure absorber and a high-pressure absorber, the evaporator is subdivided into a low-pressure evaporator and high-pressure evaporator, the cold water is first of all supplied to the high-pressure evaporator, and the cooled cold water is next supplied to the low-pressure evaporator, the concentrated solution from the auxiliary regenerator is first of all supplied to the low-pressure absorber, the refrigerant vapor from the low-pressure evaporator is absorbed, and the solution, after absorbing the refrigerant vapor in the low-pressure absorber, is supplied to the high-pressure absorber, the refrigerant vapor from the high-pressure absorber is absorbed, and the diluted solution is supplied to the auxiliary absorber.

An absorption refrigerating machine according to another embodiment of the present invention, may include a regenerator, a condenser, an absorber, an evaporator, an auxiliary regenerator and auxiliary absorber, and may be constructed such that the concentrated solution from the regenerator is heated in the auxiliary regenerator to generate refrigerant vapor and further concentrates the solution, and while cooling the diluted solution from the absorber in the auxiliary absorber, the refrigerant vapor from the auxiliary regenerator is absorbed, and the heat transfer area of the auxiliary regenerator may be equal to or smaller than one-third of the heat transfer area of the regenerator, and the heat transfer area of the auxiliary absorber may be equal to or smaller than two-thirds of the heat transfer area of the absorber.

These absorption refrigerating machines may be constructed so that the heat source substance is supplied first of all to the regenerator, and next supplied to the auxiliary regenerator.

An absorption refrigerating machine according to another embodiment of the present invention, may include a regenerator, a condenser, an absorber, an evaporator, an auxiliary regenerator and auxiliary absorber, and may have a circulating path for the absorption solution from the absorber to the auxiliary absorber, to the regenerator, to the auxiliary regenerator, and to the absorber, and may be provided with means for controlling the heat transfer performance of the auxiliary regenerator and/or means for controlling the heat transfer performance of the auxiliary absorber.

An absorption refrigerating machine may be constructed such that the absorber is subdivided into a low-pressure absorber and a high-pressure absorber, and the evaporator is subdivided into a low-pressure evaporator and high-pressure evaporator, the cold water is first of all supplied to the high-pressure evaporator, and the cooled cold water is next supplied to the low-pressure evaporator, the concentrated solution from the regenerator and the auxiliary regenerator is first of all supplied to the low-pressure absorber, the refrigerant vapor from the low-pressure evaporator is absorbed, and the solution, after absorbing the refrigerant vapor in the low-pressure absorber, is supplied to the high-pressure absorber, the refrigerant vapor from the high-pressure absorber is absorbed, and the diluted solution is supplied to the auxiliary regenerator. A structure of this type can increase the efficiency of the absorption refrigerating machine even further.

The means for controlling the heat transfer performance of the auxiliary regenerator may be a hot water flow rate control valve for controlling the flow rate of the hot water bypassing and/or passing through the auxiliary regenerator, or a solution flow rate control valve for controlling the flow rate of the solution bypassing and/or passing through the heat transfer section of the auxiliary regenerator.

The means for controlling the heat transfer performance of the auxiliary absorber may be a cooling water flow rate control valve for controlling the flow rate of cooling water bypassing and/or passing through the auxiliary absorber, or a solution flow rate control valve for controlling the flow rate of the solution bypassing and/or passing through the heat transfer section of the auxiliary absorber.

The means for controlling the heat transfer performance of the auxiliary regenerator and/or the means for controlling the heat transfer performance of the auxiliary absorber may include a control mechanism for making control based on the temperature of the hot water functioning as the heat source or the temperature of the solution in the regenerator.

An absorption refrigerating machine according to yet another embodiment of the present invention, includes a regenerator, a condenser, an absorber, an evaporator, an auxiliary regenerator and auxiliary absorber, and is constructed such that the concentrated solution from the regenerator is heated in the auxiliary regenerator and generates refrigerant vapor and is further condensed, and the generated refrigerant vapor is absorbed in the auxiliary absorber while cooling by utilizing a portion of the diluted solution mixture made up of the diluted solution of the absorber outlet and the diluted solution of the auxiliary absorber outlet, and includes a path to send the remainder of the diluted solution mixture to the regenerator, and a low-temperature heat exchanger for heating the diluted solution mixture sequentially on the path with the concentrated solution supplied from the auxiliary regenerator to the absorber, and a high-temperature heat exchanger for heating the diluted solution mixture leaving from the low-temperature heat exchanger and sent to the regenerator, with the concentrated solution supplied from the regenerator to the auxiliary regenerator.

The absorption refrigerating machine may be constructed such that, to utilize the difference between the cold water inlet and outlet temperatures to further raise efficiency, the absorber of the absorption refrigerating machine is subdivided into a low-pressure absorber and a high-pressure absorber, and the evaporator is subdivided into a low-pressure evaporator and a high-pressure evaporator, and the cold water is first of all supplied to the high-pressure evaporator, and the cooled cold water is next supplied to the low-pressure evaporator, the concentrated solution from the regenerator is first of all supplied to the low-pressure absorber, the refrigerant vapor from the low-pressure evaporator is absorbed, and the solution, after absorbing the refrigerant vapor in the low-pressure absorber, is supplied to the high-pressure absorber, the refrigerant vapor from the high-pressure evaporator is absorbed, and the diluted solution, after absorbing the refrigerant vapor in the high-pressure absorber, is mixed with the diluted solution from the auxiliary absorber to form a diluted solution mixture, and a portion of the diluted solution mixture is supplied to the auxiliary absorber, and the remainder is supplied to the regenerator.

INDUSTRIAL APPLICABILITY

The present invention constructed as described above is an absorption refrigerating machine utilizing hot water of 60 to 70 degrees Celsius as a heat source, and although inferior to the single effect absorption refrigerating machine, provides better efficiency than the double-concentrating type absorption refrigerating machine, and can be effectively utilized under open air conditions where the temperature of the cooling water has dropped, in other words the efficiency increases as the cooling water temperature drops, and according to the temperature conditions, can be operated with the same efficiency as the single effect type.

The invention claimed is:

1. An absorption refrigerating machine comprising:
    a regenerator generating refrigerant vapor and concentrating a solution;
    a condenser condensing the generated refrigerant vapor;
    an evaporator evaporating the condensed refrigerant;
    an absorber absorbing the evaporated refrigerant vapor into the solution;
    an auxiliary regenerator heating the concentrated solution from the regenerator, generating the refrigerant vapor and further concentrating the solution;
    an auxiliary absorber absorbing the refrigerant vapor generated in the auxiliary regenerator while cooling a first and a second diluted solutions, the auxiliary absorber utilizes a portion of a diluted solution mixture made of the second diluted solution from an absorber outlet and the first diluted solution from an auxiliary absorber outlet;
    a path for sending the remainder of the diluted solution mixture to the regenerator;
    a low-temperature heat exchanger heating the diluted solution mixture sequentially on the path with the concentrated solution supplied from the auxiliary regenerator to the absorber; and
    a high-temperature heat exchanger heating the diluted solution mixture leaving from the low-temperature heat exchanger and sent to the regenerator with the concentrated solution supplied from the regenerator to the auxiliary regenerator.

2. The absorption refrigerating machine according to claim 1, wherein the absorber is subdivided into a low-pressure absorber and a high-pressure absorber, the evaporator is subdivided into a low-pressure evaporator and a high-pressure evaporator, cold water is first of all supplied to the high-pressure evaporator, the cooled cold water is next supplied to the low-pressure evaporator, the concentrated solution from the regenerator is first of all supplied to the low-pressure absorber, the refrigerant vapor from the low-pressure evaporator is absorbed, the solution, after absorbing the refrigerant vapor in the low-pressure absorber is supplied to the high-pressure absorber, the refrigerant vapor from the high-pressure evaporator is absorbed, a portion of a diluted solution mixture of the second diluted solution from the high-pressure absorber outlet absorbing the refrigerant vapor and the first diluted solution from the auxiliary absorber outlet is supplied to the auxiliary absorber, and the remainder is sent to the regenerator.

3. The absorption refrigerating machine according to claim 1, wherein a heat source substance for heating the solution is first of all supplied to the regenerator, and then supplied to the auxiliary regenerator.

4. An absorption refrigerating machine comprising:
    a regenerator generating refrigerant vapor and concentrating a solution;
    an evaporator evaporating a refrigerant;
    an absorber absorbing the evaporated refrigerant vapor into the solution;
    an auxiliary regenerator heating the concentrated solution from the regenerator, generating the refrigerant vapor and further concentrating the solution;
    a heat exchanger performing heat exchange between the concentrated solution sent from the auxiliary regenerator to the absorber with the diluted solution sent from the absorber to the regenerator.

* * * * *